(12) United States Patent
Suzuki et al.

(10) Patent No.: US 8,982,408 B2
(45) Date of Patent: Mar. 17, 2015

(54) COLOR IMAGE CAPTURING, MEASURING, AND FORMATION USING CAPTURE UNIT WITH SPECULAR REFLECTION PREVENTING MEMBER

(71) Applicants: Yasuyuki Suzuki, Kanagawa (JP); Nobuyuki Satoh, Kanagawa (JP); Mamoru Yorimoto, Kanagawa (JP); Suguru Yokozawa, Kanagawa (JP); Masato Kobayashi, Kanagawa (JP); Yuichi Sakurada, Tokyo (JP); Tatsuhiko Okada, Saitama (JP); Tomokazu Kanzawa, Saitama (JP); Daisaku Horikawa, Saitama (JP); Hiroshi Matsumoto, Saitama (JP)

(72) Inventors: Yasuyuki Suzuki, Kanagawa (JP); Nobuyuki Satoh, Kanagawa (JP); Mamoru Yorimoto, Kanagawa (JP); Suguru Yokozawa, Kanagawa (JP); Masato Kobayashi, Kanagawa (JP); Yuichi Sakurada, Tokyo (JP); Tatsuhiko Okada, Saitama (JP); Tomokazu Kanzawa, Saitama (JP); Daisaku Horikawa, Saitama (JP); Hiroshi Matsumoto, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/838,262

(22) Filed: Mar. 15, 2013

(65) Prior Publication Data
US 2013/0242320 A1 Sep. 19, 2013

(30) Foreign Application Priority Data

Mar. 19, 2012 (JP) ................................. 2012-061670
Feb. 14, 2013 (JP) ................................. 2013-027144

(51) Int. Cl.
*H04N 1/00* (2006.01)
*H04N 1/028* (2006.01)
*H04N 1/48* (2006.01)
*G06K 15/02* (2006.01)
*H04N 1/60* (2006.01)

(52) U.S. Cl.
CPC .............. *G06K 15/02* (2013.01); *H04N 1/6033* (2013.01)
USPC ............ 358/1.6; 358/504; 358/505; 358/509; 358/518

(58) Field of Classification Search
None
See application file for complete search history.

(56) References Cited

U.S. PATENT DOCUMENTS 6,778,714 B1 * 8/2004 Kipman et al. ................ 382/313
(Continued)

FOREIGN PATENT DOCUMENTS

| CN | 102189816 A | 9/2011 |
|----|-------------|--------|
| JP | 3129502 | 11/2000 |
| JP | 2009-188502 | 8/2009 |
| JP | 4671117 | 1/2011 |

OTHER PUBLICATIONS

U.S. Appl. No. 13/687,520, filed Nov. 28, 2012, Satoh, et al.
(Continued)

*Primary Examiner* — Scott A Rogers
(74) *Attorney, Agent, or Firm* — Oblon, Spivak, McClelland, Maier & Neustadt, L.L.P.

(57) ABSTRACT

An image capturing unit includes: a sensor unit that captures an image of a predetermined area including an image capture object; a reference chart portion that is disposed in the predetermined area and an image of which is captured together with an image of the image capture object by the sensor unit; an illumination light source that illuminates the image capture object and the reference chart portion; and a specular reflection preventing member that prevents that specular reflection light of light emitted from the illumination light source enters the sensor unit.

8 Claims, 33 Drawing Sheets

(56) References Cited

U.S. PATENT DOCUMENTS

| | | |
|---|---|---|
| 7,676,061 B2 | 3/2010 | Harrison et al. |
| 8,446,651 B2 * | 5/2013 | Murosaki ................ 358/473 |
| 8,532,371 B2 * | 9/2013 | Agarwal et al. ............ 382/162 |
| 2007/0064174 A1 | 3/2007 | Kitamura et al. |
| 2012/0069411 A1 | 3/2012 | Satoh et al. |
| 2013/0004189 A1 * | 1/2013 | Hashiguchi et al. .......... 399/49 |
| 2013/0027720 A1 | 1/2013 | Satoh |
| 2013/0027721 A1 | 1/2013 | Kobayashi et al. |

OTHER PUBLICATIONS

U.S. Appl. No. 13/780,340, filed Feb. 28, 2013, Yokozawa.
U.S. Appl. No. 13/800,001, filed Mar. 13, 2013, Matsumoto, et al.
U.S. Appl. No. 13/835,823, filed Mar. 15, 2013, Suzuki, et al.
U.S. Appl. No. 13/845,964, filed Mar. 18, 2013, Okada, et al.
Office Action issued Nov. 3, 2014 in Chinese Patent Application No. 201310088676.6 (with English translation).

* cited by examiner

MEMORY TABLE Tb1

INITIAL REFERENCE RGB VALUES (RdGdBd) /125

| PATCH NUMBER | Rd | Gd | Bd | Ld | ad | bd | xd | yd | zd |
|---|---|---|---|---|---|---|---|---|---|
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

COLOR IMAGE CAPTURING, MEASURING, AND FORMATION USING CAPTURE UNIT WITH SPECULAR REFLECTION PREVENTING MEMBER

CROSS-REFERENCE TO RELATED APPLICATIONS

The present application claims priority to and incorporates by reference the entire contents of Japanese Patent Application No. 2012-061670 filed in Japan on Mar. 19, 2012 and Japanese Patent Application No. 2013-027144 filed in Japan on Feb. 14, 2013.

BACKGROUND OF THE INVENTION

1. Field of the Invention

The present invention relates to an image capturing unit, a color measuring device, an image forming apparatus, a color measuring system, and a color measurement method.

2. Description of the Related Art

As improvement in image quality has been made, image forming apparatuses, such as color inkjet image forming apparatuses and color electrophotographic image forming apparatuses, have come to be used for offset printing of advertising media, brochures, and the like that require high quality images in a relatively small number of copies.

In the case of the offset printing requiring a high image quality, there are cases in which colors of a printed product required by a client differ from colors of printed-out results actually printed out by an image forming apparatus.

While a client normally checks colors of a printed product on a display and then places an order for printing, each image forming apparatus has color reproduction characteristics specific to the model thereof. This may lead to printed results having different colors from those checked on the display.

To address this, techniques have been used that reproduce colors by using a color space, such as an L*a*b* color space or an XYZ color space, that does not depend on devices such as a display and an image forming apparatus.

An image forming apparatus controls amounts of color materials and the like to output specified colors. For example, an inkjet image forming apparatus arithmetically controls ink discharge amounts, print patterns, and the like to control the amounts of ink discharged from ink heads so as to control output colors. An electrophotographic image forming apparatus controls amounts of toner on photosensitive elements, light intensity of laser beams thereon, and the like so as to control output colors.

Amounts of color materials such as ink discharge amounts of an inkjet image forming apparatus, however, fluctuate due to factors such as states of nozzles of the heads, fluctuation in viscosity of ink, and fluctuation of discharge driving elements (such as piezoelectric elements), thus causing fluctuation in color reproducibility. Ink discharge amounts of an inkjet image forming apparatus change with time in one image forming apparatus and differ between image forming apparatuses, thereby generating fluctuation in color reproduction of images with time and between image forming apparatuses.

To address this, an image forming apparatus has conventionally performed color adjustment processing to reduce fluctuation in output due to device-specific characteristics so as to enhance the reproducibility of input in output. In this color adjustment processing, for example, the image forming apparatus first actually outputs an image of a color patch having a reference color (reference color patch image), and a color measuring device measures the color of the reference color patch image. Then, based on a difference between the color measurement value of the reference color patch image measured by the color measuring device and a color specification value in a standard color space of a corresponding standard color, a color conversion parameter is generated and set to the image forming apparatus. Thereafter, based on the thus set color conversion parameter, the image forming apparatus applies, when outputting an image corresponding to input image data, color conversion to the input image data. Based on this color-converted image data, the image forming apparatus then records and outputs the image. This reduces fluctuation in output due to device-specific characteristics so as to output an image with high color reproducibility.

In this conventional color adjustment processing, a spectrophotometric colorimeter is widely used as the color measuring device which measures the color of a reference color patch image. A spectrophotometric colorimeter can perform highly accurate color measurement because of capability of obtaining a spectral reflectance factor for each wavelength. A spectrophotometric colorimeter is, however, an expensive device, and thus, it is desired to make it possible to perform highly accurate color measurement using a lower cost device.

Hence, there has been conventionally disclosed a color measuring device which includes a reference color measuring unit that measures, in advance, a color of a reference color patch so as to obtain a color reference value as RGB data; a color image input unit that captures an image of an image capture object including the reference color patch and a target for color measurement simultaneously or separately so as to obtain RGB data; an image extracting unit that extracts the RGB data of the reference color patch and the RGB data of the target for color measurement from the RGB data obtained by the color image input unit; and an arithmetic unit that obtains a difference between the RGB data of the reference color patch obtained by the image extracting unit and the RGB data of the reference color patch obtained by the reference color measuring unit and then uses the difference to correct at least the RGB data of the target for color measurement for color (refer to Japanese Patent No. 3129502). This conventional technique discloses placing the reference color patch to be compared with the image capture object near the image capture object that is a target for color measurement; simultaneously capturing the images of the image capture object and of the reference color patch using a color video camera serving as the color image input unit; correcting the RGB data of the image capture object by using the RGB data of the reference color patch obtained by the image capturing; and converting the RGB data of the image capture object into the color specification value in the standard color space.

This technique described in Japanese Patent No. 3129502 has, however, a difficulty in maintaining a constant positional relation among the image capture object, the reference color patch, and the color video camera. Thus, image capturing conditions can change each time image capturing is performed, resulting in impossibility of stable image capturing.

In view of the above description, there is a need to provide an image capturing unit, a color measuring device, an image forming apparatus, a color measuring system, and a color measurement method that enable stable image capturing.

SUMMARY OF THE INVENTION

It is an object of the present invention to at least partially solve the problems in the conventional technology.

An image capturing unit includes: a sensor unit that captures an image of a predetermined area including an image capture object; a reference chart portion that is disposed in the predetermined area and an image of which is captured together with an image of the image capture object by the sensor unit; an illumination light source that illuminates the image capture object and the reference chart portion; and a specular reflection preventing member that prevents that specular reflection light of light emitted from the illumination light source enters the sensor unit.

A color measuring device includes: a sensor unit that captures an image of a predetermined area including an image capture object; a reference chart portion that is disposed in the predetermined area and an image of which is captured together with an image of the image capture object by the sensor unit; an illumination light source that illuminates the image capture object and the reference chart portion; a specular reflection preventing member that prevents that specular reflection light of light emitted from the illumination light source enters the sensor unit; and a calculating unit that calculates color measurement values of the image capture object based on image capture data obtained by capturing images of the image capture object and the reference chart portion by the sensor unit.

A color measuring system includes: an image capturing unit that captures an image of an image capture object that is a target for color measurement; and a calculating unit that calculates color measurement values of the image capture object. The image capturing unit includes: a sensor unit that captures an image of a predetermined area including the image capture object; a reference chart portion that is disposed in the predetermined area and an image of which is captured together with an image of the image capture object by the sensor unit; an illumination light source that illuminates the image capture object and the reference chart portion; and a specular reflection preventing member that prevents that specular reflection light of light emitted from the illumination light source enters the sensor unit. The calculating unit calculates the color measurement values of the image capture object based on image capture data obtained by capturing images of the image capture object and the reference chart portion by the sensor unit of the image capturing unit.

A color measuring method is executed in a color measuring device comprising a sensor unit, a reference chart portion, an illumination light source, a specular reflection preventing member, and a calculating unit. The color measuring method includes: an illuminating step at which the illumination light source illuminates an image capture object that is a target for color measurement and the reference chart portion; an image capturing step at which the sensor unit captures an image of the image capture object and the reference chart portion which are illuminated by the illumination light source; and a calculating step at which the calculating unit calculates color measurement values of the image capture object based on image capture data obtained by capturing images of the image capture object and the reference chart portion by the sensor unit. At the illuminating step, the specular reflection preventing member prevents that specular reflection light of light emitted from the illumination light source enters the sensor unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of the present invention will be described below in detail with reference to the accompanying drawings. Note that the embodiment described below is an exemplary embodiment of the present invention, and thus is attached with various technically preferable limitations. The scope of the present invention is, however, not unduly limited by the description given below. Furthermore, it is not necessarily the case that all configurations described in the present embodiment are essential constitutional requirements of the present invention.

Note that the term "Lab (Lab values)" to be described below refers to (values of) the CIELAB (CIE 1976 L*a*b*) color space. Hereinafter, for convenience of description, "L*a*b*" will be written simply as "Lab".

Figure 1:
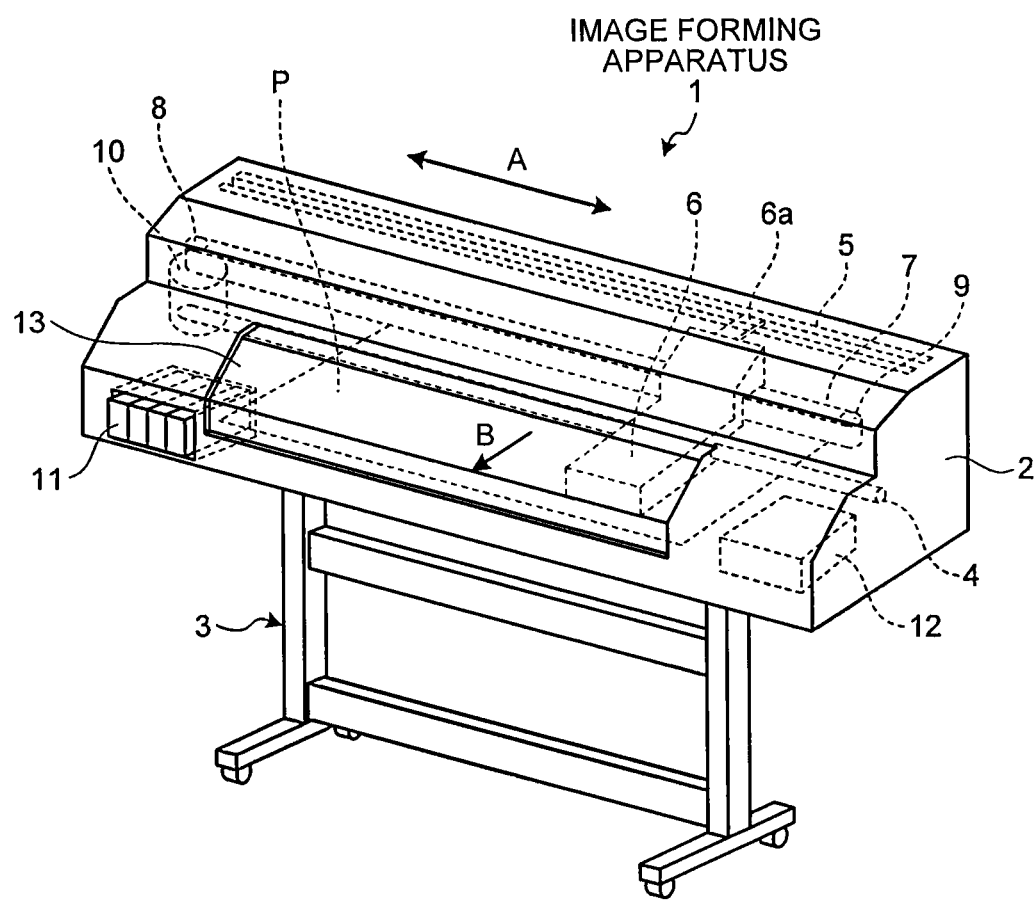
FIG. 1 is a schematic perspective view of an image forming apparatus of an embodiment of the present invention.

FIGS. 1 to 37 are diagrams illustrating the embodiment of an image capturing unit, a color measuring device, an image forming apparatus, a color measuring system, and a color measurement method of the present invention. FIG. 1 is a schematic perspective view of an image forming apparatus 1 provided with the image capturing unit, the color measuring device, the image forming apparatus, and the color measuring system of the present invention, and applied with the color measurement method of the present invention.

In the image forming apparatus 1 in FIG. 1, a main unit housing 2 is arranged on a main unit frame 3. A main guide rod 4 and a sub guide rod 5 are provided across the inside of the main unit housing 2 in the main-scanning direction indicated by bidirectional arrow A in FIG. 1. The main guide rod 4 movably supports a carriage 6. The carriage 6 is provided with a connecting piece 6a that engages with the sub guide rod 5 to stabilize the attitude of the carriage 6. The image forming apparatus 1 is provided with an endless belt-like timing belt 7 arranged along the main guide rod 4. The timing belt 7 is stretched across between a driving pulley 8 and a driven pulley 9. The driving pulley 8 is rotationally driven by a main-scanning motor 10. The driven pulley 9 is arranged in a state of giving a predetermined tension to the timing belt 7. By being rotationally driven by the main-scanning motor 10, the driving pulley 8 rotationally moves the timing belt 7 in the main-scanning direction corresponding to the direction of the rotation of the main-scanning motor 10.

The carriage 6 is connected to the timing belt 7, which is rotationally moved in the main-scanning direction by the driving pulley 8 so as to reciprocate the carriage 6 along the main guide rod 4 in the main-scanning direction.

The image forming apparatus 1 houses a cartridge unit 11 and a maintenance mechanism 12 in both end positions in the main-scanning direction in the main unit housing 2. The cartridge unit 11 houses, in a replaceable manner, cartridges each containing yellow (Y) ink, magenta (M) ink, cyan (C) ink, and black (K) ink. The cartridges in the cartridge unit 11 are connected to print heads 20y, 20m, 20c, and 20k (refer to FIG. 2) of the corresponding colors in a print head 20 mounted on the carriage 6 through pipes (not illustrated). Ink is supplied to the print heads 20y, 20m, 20c, and 20k from the respective cartridges corresponding thereto through the pipes. Note that, in the description given below, the print heads 20y, 20m, 20c, and 20k will be called the print head 20 when they are collectively named.

As will be described later, while moving the carriage 6 in the main-scanning direction, the image forming apparatus 1 discharges ink onto a recording medium P that is intermittently conveyed on a platen 14 (refer to FIG. 2) in the sub-scanning direction (in the direction of arrow B in FIG. 1) perpendicular to the main-scanning direction. Thus, the image forming apparatus 1 records and outputs an image onto the recording medium P.

Specifically, the image forming apparatus 1 of the present embodiment intermittently conveys the recording medium P in the sub-scanning direction, and while the conveyance of the recording medium P is stopped, the image forming apparatus 1 moves the carriage 6 in the main-scanning direction and simultaneously discharges ink onto the recording medium P on the platen 14 from nozzle rows of the print head 20 mounted on the carriage 6, thus forming an image on the recording medium P.

The cartridge unit 11 performs cleaning of discharge surfaces of the print head 20, capping, discharge of unnecessary ink, and the like so as to exhaust the unnecessary ink from the print head 20 and maintain reliability of the print head 20.

The image forming apparatus 1 is provided with a cover 13 so as to be capable of opening and closing a portion for conveying the recording medium P. When the image forming apparatus 1 is maintained or a jam occurs therein, opening the cover 13 enables maintenance of the inside of the main unit housing 2, removal of the jammed recording medium P, or the like.

Figure 2:
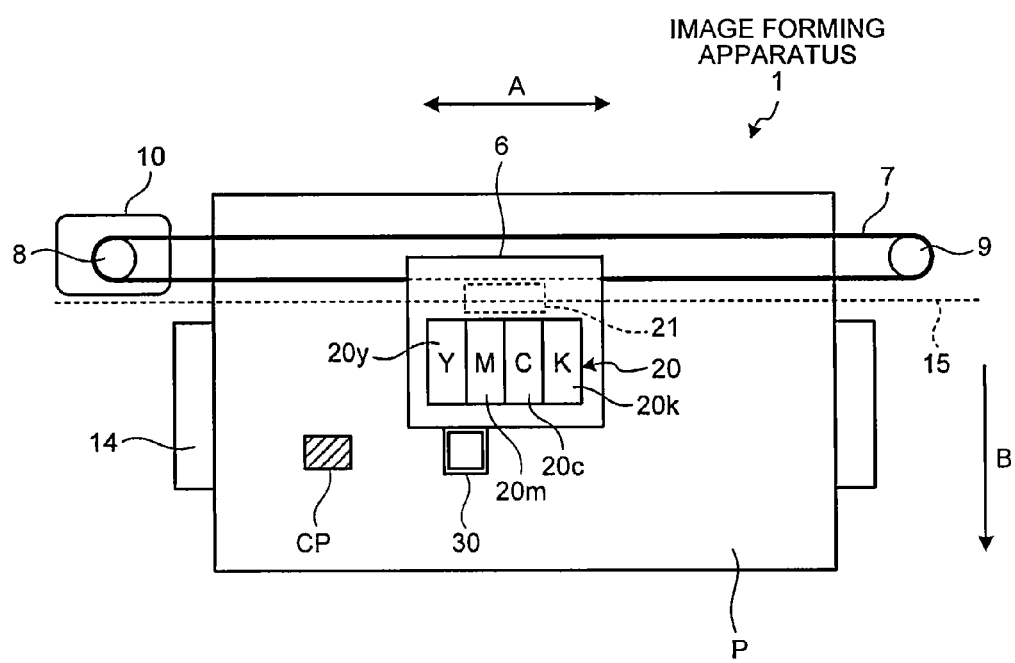
FIG. 2 is a plan view of a carriage portion.

As illustrated in FIG. 2, the carriage 6 has the print heads 20y, 20m, 20c, and 20k. Each of the print heads 20y, 20m, 20c, and 20k is connected through the pipe to the cartridge of the corresponding color in the cartridge unit 11, and discharges ink of the corresponding color onto the recording medium P opposed to the head. Specifically, the print head 20y discharges yellow (Y) ink; the print head 20m discharges magenta (M) ink; the print head 20c discharges cyan (C) ink; and the print head 20k discharges black (K) ink.

The print head 20 is mounted on the carriage 6 so that the discharge surfaces (nozzle surfaces) thereof face downward (toward the recording medium P) in FIG. 1, and discharges ink onto the recording medium P.

The image forming apparatus 1 is provided with an encoder sheet 15 arranged in parallel with the timing belt 7, that is, with the main guide rod 5 at least over a range of movement of the carriage 6. The carriage 6 mounts thereon an encoder sensor 21 for reading the encoder sheet 15. Based on a result of reading the encoder sheet 15 by the encoder sensor 21, the image forming apparatus 1 controls drive of the main-scanning motor 10 so as to control the movement of the carriage 6 in the main-scanning direction.

Figure 3:
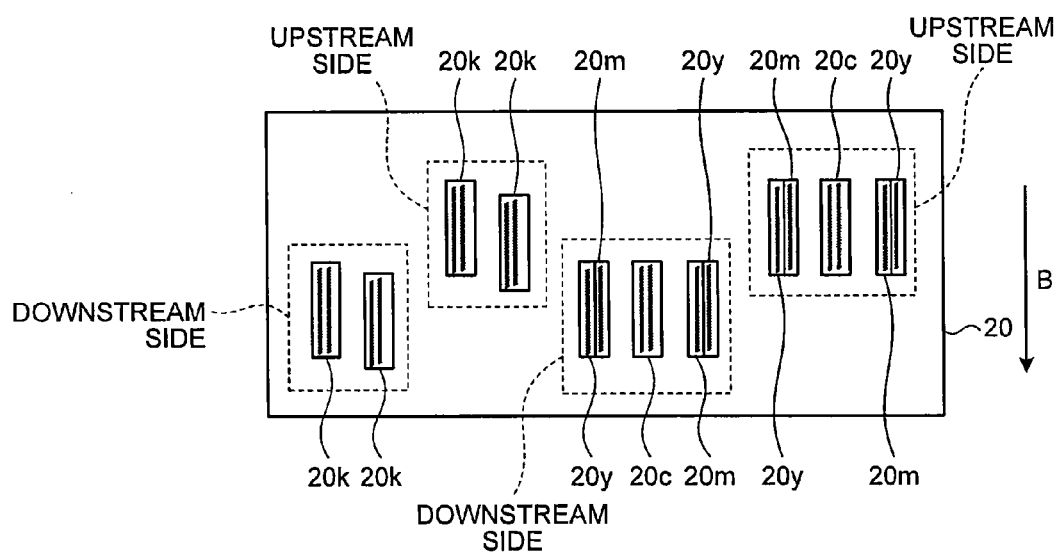
FIG. 3 is a layout diagram of print heads.

As illustrated in FIG. 3, in the print head 20 mounted on the carriage 6, each of the print heads 20y, 20m, 20c, and 20k is composed of a plurality of nozzle rows. Ink is discharged from the nozzle rows onto the recording medium P conveyed on the platen 14 so as to form an image on the recording medium P. In order to ensure a wide width of an image formed on the recording medium P through one scanning motion, the image forming apparatus 1 has, on the carriage 6, the print head 20 on the upstream side and the print head 20 on the downstream side. In order to improve the print speed with black ink, the carriage 6 has twice as many of the print heads 20k as each of the print heads 20y, 6m, and 6c that discharge color ink. In order to have the same order of the colors superimposed during back and forth movements of the carriage 6 so as to prevent change in color resulted from taking forward and backward paths, the print heads 20y and 6m are divided in the main-scanning direction and arranged adjacent to each other. The arrangement of the print heads 20y, 20m, 20c, and 20k of the print head 20 is not limited to the arrangement illustrated in FIG. 3.

As illustrated in FIG. 2, the carriage 6 mounts thereon an image capturing unit 30. The image capturing unit 30 captures an image of an image capture object to measure colors of the image capture object (color measurement target) at the time of color adjustment processing to be described later.

Figure 4:
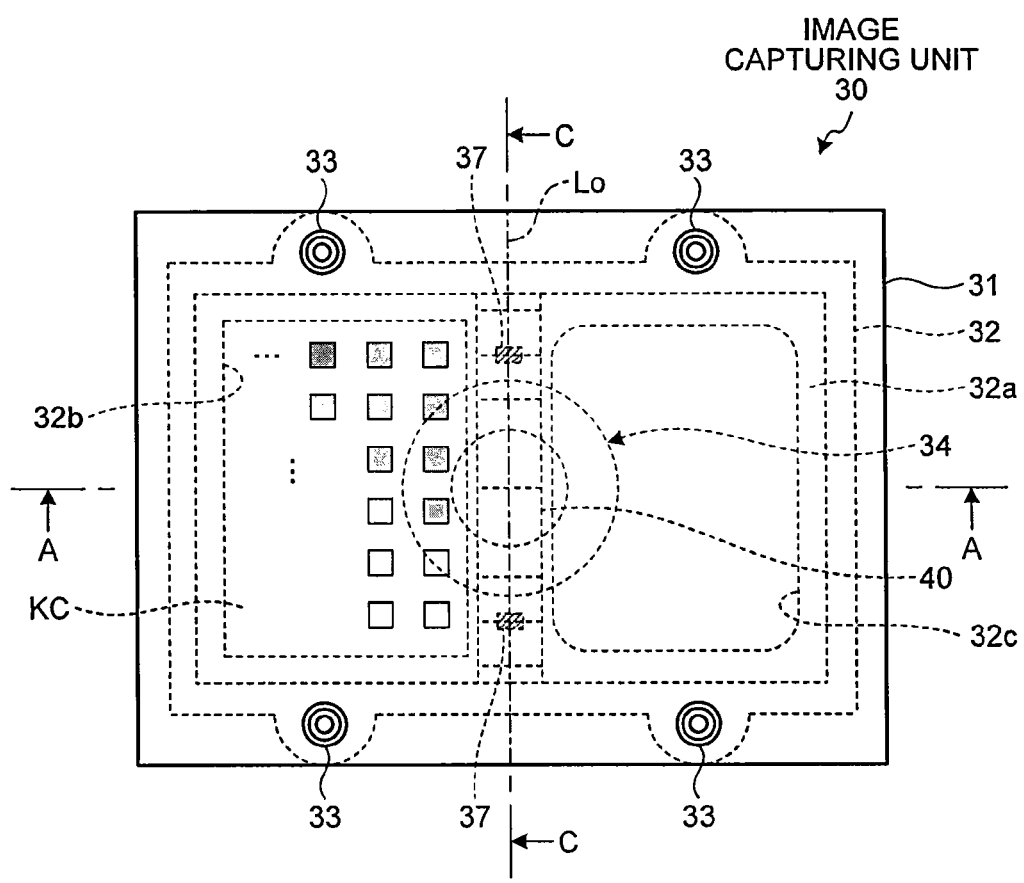
FIG. 4 is a plan view of an image capturing unit.
Figure 5:
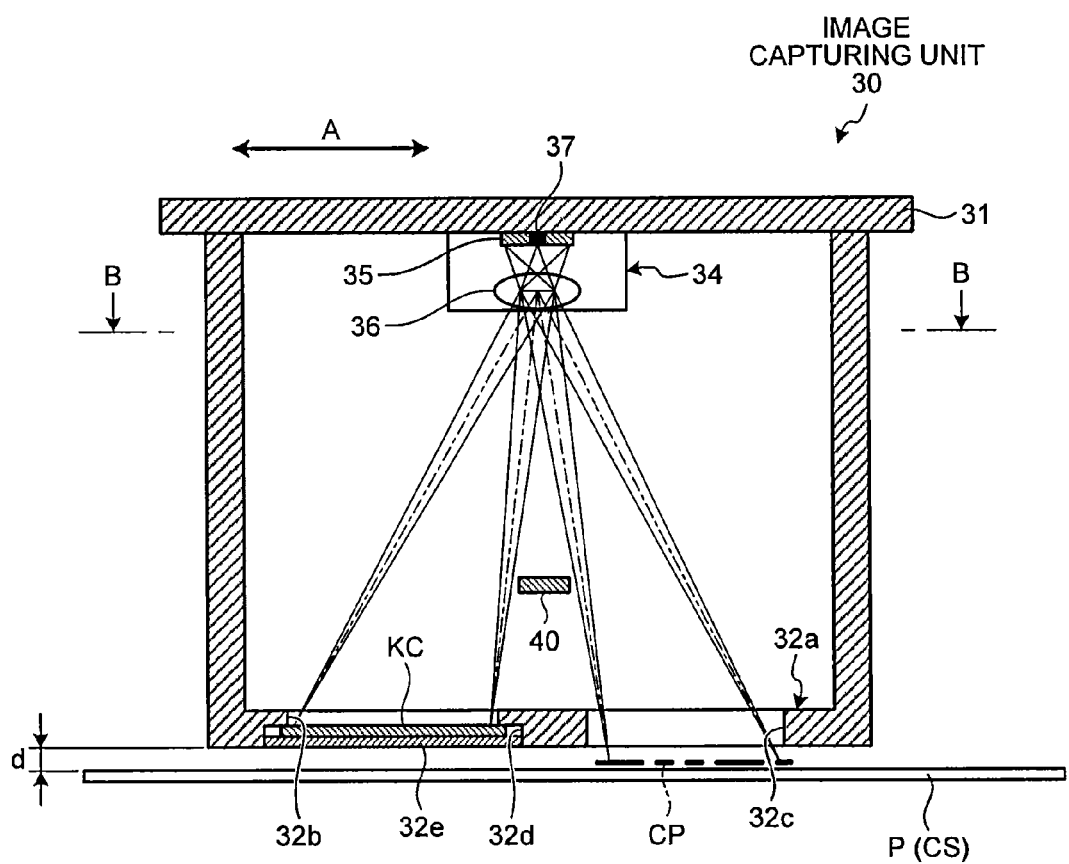
FIG. 5 is a sectional view of the image capturing unit as viewed along arrows A-A in FIG. 4.
Figure 6:
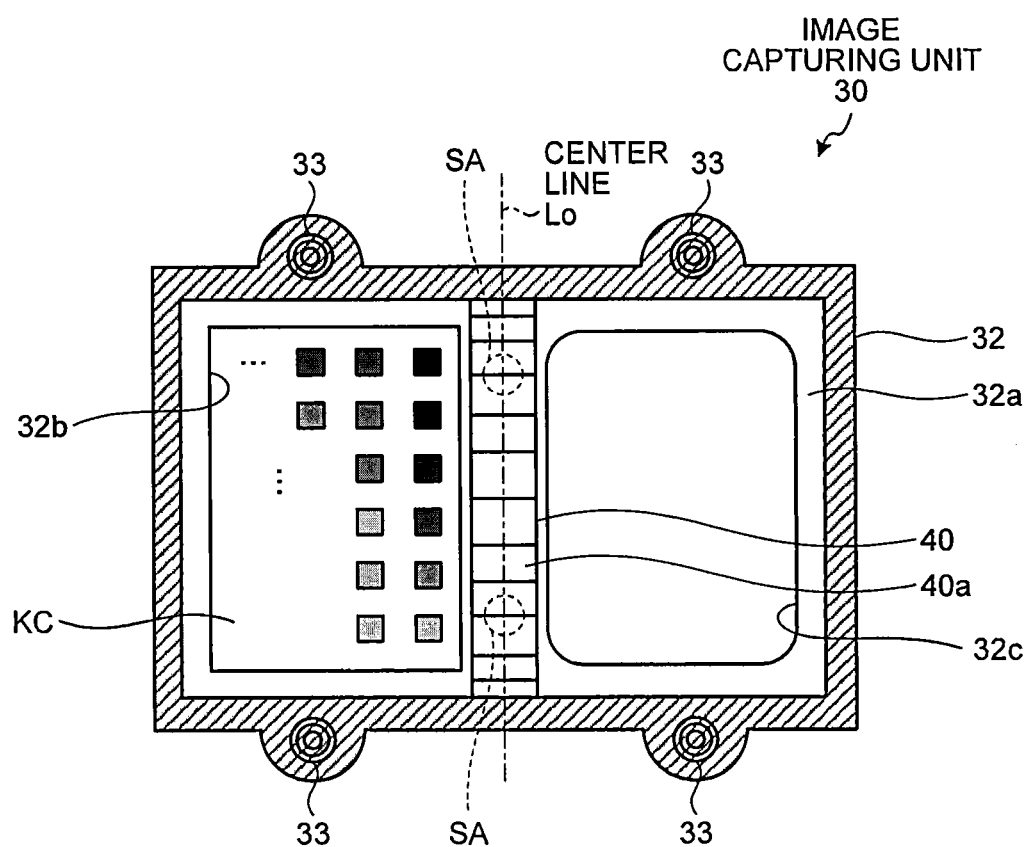
FIG. 6 is a sectional view of the image capturing unit as viewed along arrows B-B in FIG. 5.
Figure 7:
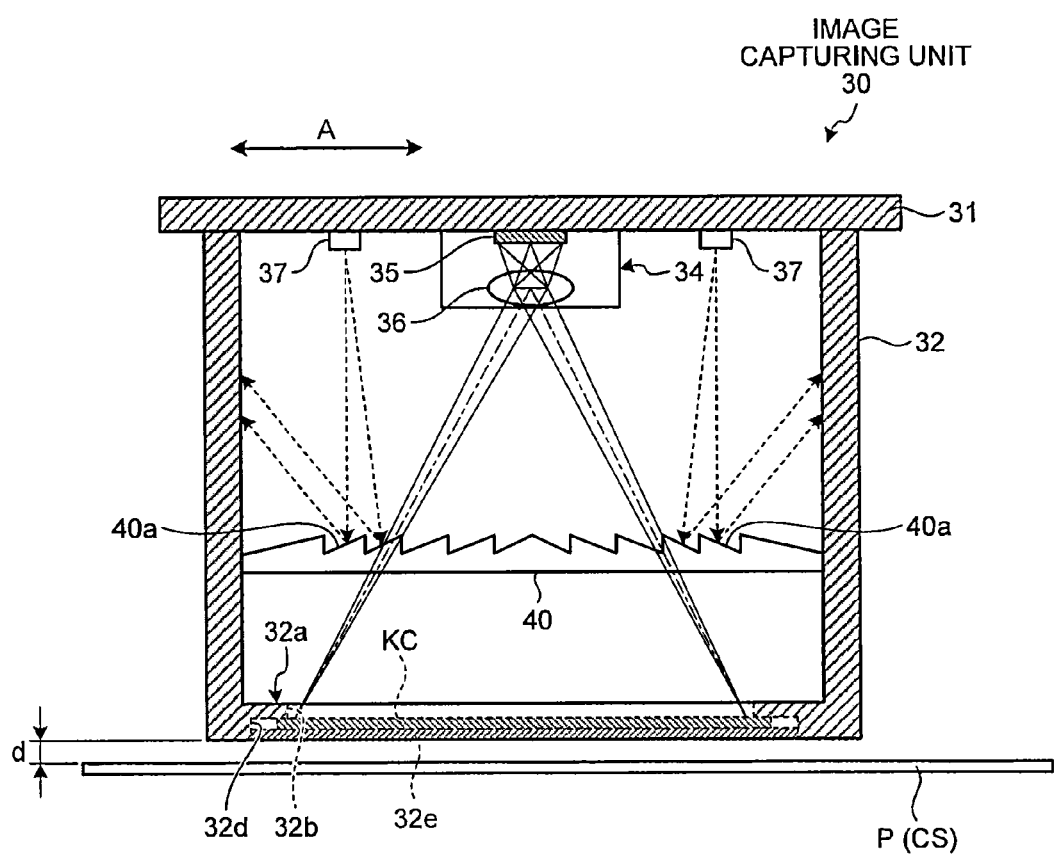
FIG. 7 is a sectional view of the image capturing unit as viewed along arrows C-C in FIG. 4.

The image capturing unit 30 is provided with a base plate 31 as illustrated in FIG. 4 that is a plan view, in FIG. 5 that is a sectional view as viewed along arrows A-A in FIG. 4, in FIG. 6 that is a sectional view as viewed along arrows B-B in FIG. 5, and in FIG. 7 that is a sectional view as viewed along arrows C-C in FIG. 4. A quadrangular box-shaped frame body 32 having an open face toward the base plate 31 is fixed to the base plate 31 with fastening members 33. The base plate 31 is fixed to the carriage 6 illustrated in FIG. 1. Note that the frame body 32 is not limited to the quadrangular box-shaped one, but may be, for example, a circular cylindrical box-shaped one or an elliptic cylindrical box-shaped one that has a bottom face portion 32a having openings 32b and 32c.

The base plate 31 of the image capturing unit 30 has an image sensor unit (sensor unit) 34 at a central part of the surface thereof on the side of the frame body 32. The image sensor unit 34 is provided with a two-dimensional image sensor 35 such as a charge-coupled device (CCD) sensor or a complementary metal oxide semiconductor (CMOS) sensor, and with a lens 36.

The image capturing unit 30 is mounted on the carriage 6 in a state in which the lower surface of the face portion (hereinafter called "bottom face portion") 32a of the frame body 32 on the side opposite to the base plate 31 faces the recording medium P on the platen 14 with a predetermined distance d between the lower surface and the recording medium P. The bottom face portion (opposing face) 32a has the opening 32b and the opening 32c having each a substantially rectangular shape with a center line Lo serving as the center therebetween in the main-scanning direction.

As will be described later, the distance d is preferably small in view of a focal length for the two-dimensional image sensor 35. From the viewpoint of a relation with planarity of the recording medium P, however, the distance d is set to an amount, such as 1 mm to 2 mm, at which the lower surface of the frame body 32 does not touch the recording medium P.

As will be described later, the opening 32c is used for capturing images of reference color patches KP (refer to FIG. 12) of a reference sheet KS (refer to FIG. 12) and color measurement adjusting color patches CP (refer to FIG. 15) of a color measurement adjusting sheet CS (refer to FIG. 15) that serve as targets for image capture (image capture object) formed on the recording medium P. The opening 32c only needs to have a size at least large enough to be capable of capturing all images to be captured. The distance d existing between the frame body 32 and the target for image capture generates shadow on the periphery of the opening 32c. With the shadow taken into consideration, the opening 32c is formed in a state of being opened to a size slightly larger than that of the image capturing area of the target for image capture.

On the face toward the recording medium P at the opening 32b, a depressed portion 32d having a predetermined width is formed along the circumference of the opening 32b. A reference chart (reference chart portion) KC is set in a detachable manner on the depressed portion 32d. A holding plate 32e is mounted in a detachable manner on the depressed portion 32d around the opening 32b of the frame body 32 by being embedded, by being screwed, or by any other method. The holding plate 32e covers the face of the reference chart KC on the side of the recording medium P and holds the reference chart KC on the depressed portion 32d. The opening 32b is blocked up by the reference chart KC and the holding plate 32e. The holding plate 32e has a smooth flat surface on the face thereof toward the recording medium P.

The reference chart KC is photographed by the image capturing unit 30 together with the reference color patches KP and the color measurement adjusting color patches CP as an object to be compared with captured image color measurement values of the above-mentioned reference color patches KP of the reference sheet KS and the above-mentioned color measurement adjusting color patches CP of the color measurement adjusting sheet CS serving as a target for image capture in the color adjustment processing. Specifically, the image capturing unit 30 captures images of the reference color patches KP of the reference sheet KS and the color measurement adjusting color patches CP of the color measurement adjusting sheet CS located outside the frame body 32 through the opening 32c provided at the bottom face portion 32a of the frame body 32. The image capturing unit 30 also captures, as the object of comparison, images of color patches on the reference chart KC mounted on the depressed portion 32d formed on the periphery of the opening 32b of the bottom face portion 32a of the frame body 32. Note that, in the image capturing unit 30, the two-dimensional image sensor 35 reads the images by sequentially scanning pixels. Therefore, in a strict sense, the reference color patches KP of the reference sheet KS, the color measurement adjusting color patches CP of the color measurement adjusting sheet CS, and the reference chart KC are not read at the same time, but their images can be acquired in one frame. Hereinafter, capturing images in one frame will be expressed, for example, as simultaneously capturing images, where appropriate.

Figure 8:
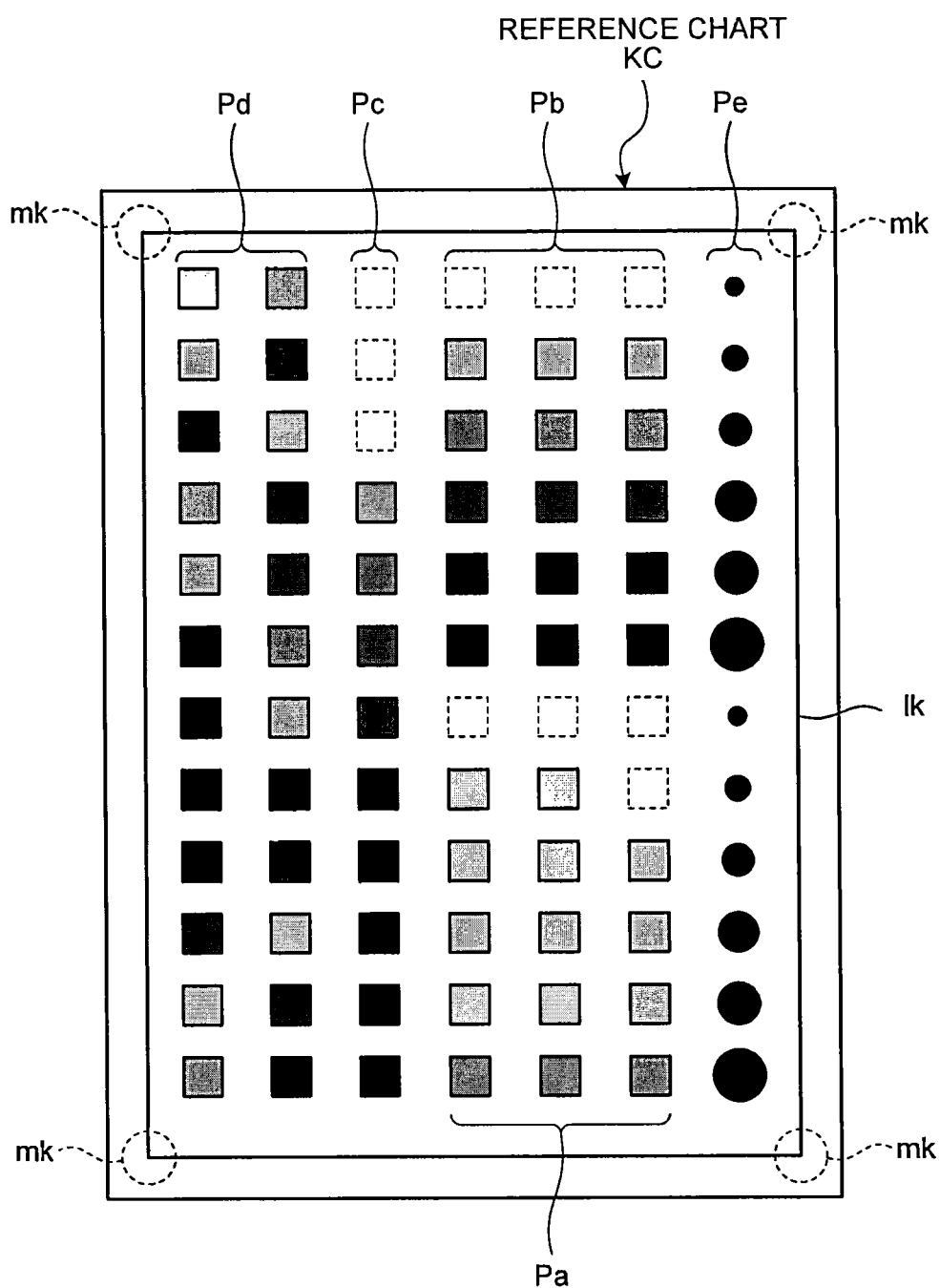
FIG. 8 is a plan view of a reference chart.
Figure 9:
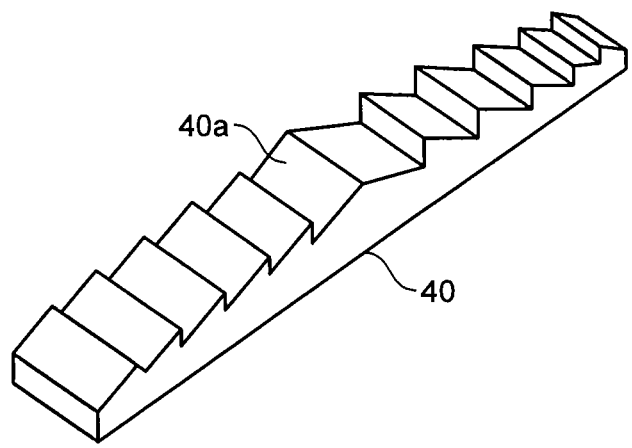
FIG. 9 is an enlarged perspective view of a diffusion plate.

As illustrated in FIG. 8, in the same manner as the reference sheet KS to be described later, the reference chart KC is provided, on the face thereof inward of the frame body 32 (on the upper face thereof), with a plurality of reference color patch rows Pa to Pd for color measurement, a pattern row Pe for dot diameter measurement, a line lk for distance measurement, and markers mk for chart position identification.

The reference color patch rows Pa to Pd for color measurement include the patch row Pa in which color patches of first order colors of Y, M, and C are arranged in the order of gradation, the patch row Pa in which color patches of second order colors of R, G, and B are arranged in the order of gradation, the patch row (gradation pattern of achromatic colors) Pc in which grayscale patches are arranged in the order of gradation, and the patch row Pd in which patches of third order colors are arranged. The pattern row Pe for dot diameter measurement is a pattern row for measurement of geometric shapes in which circular patterns of different sizes are arranged in the order of size.

The line lk for distance measurement is formed as a rectangular border line surrounding the reference color patch rows Pa to Pd for color measurement and the pattern row Pe for dot diameter measurement. The markers mk for chart position identification are markers that are provided in four corner positions of the line lk for distance measurement and are used for identifying positions of the patches.

A color measurement control unit 106 (refer to FIGS. 10 and 11), to be described later, identifies, from the image data of the reference chart KC obtained from the image capturing unit 30, the line lk for distance measurement and the markers mk for chart position identification located at the four corners thereof, so as to identify the position of the reference chart KC and the positions of the patterns.

In the same manner as the reference color patches KP of the reference chart KC to be described later, the patches constituting the reference color patch rows Pa to Pd for color measurement are measured in advance to obtain color specification values (Lab values) in a Lab color space serving as a standard color space by using a spectrometer BS. The color specification values serve as reference values used when the color of the color measurement adjusting color patches CP of the color measurement adjusting sheet CS, to be described later, are measured.

Note that the configuration of the reference color patch rows Pa to Pd for color measurement arranged in the reference chart KC is not limited to the example arrangement illustrated in FIG. 8, but any patch rows can be used. For example, it is possible to use patches that enable identification of as wide color range as possible, or the patch row Pa of the first order colors of Y, M, C, and K and the patch row Pc of the grayscale patches may be composed of patches having color measurement values of ink used for the image forming apparatus 1. The patch row Pa of the second order colors of R, G, and B on the reference chart KC may be composed of patches having color measurement values achievable by ink used for the image forming apparatus 1, or it is possible to use reference color patches with specified color measurement values such as Japan Color values.

Note that, although the present embodiment uses the reference chart KC including the reference color patch rows Pa to Pd having a general shape of patches (color patches), the reference chart KC does not necessarily include such reference color patch rows Pa to Pd. The reference chart KC only needs a plurality of colors usable for color measurement to be arranged so that positions of the colors can be identified.

The reference chart KC is arranged on the depressed portion 32*d* formed on the outer circumference of the face toward the recording medium P at the opening 32*b* formed at the bottom face portion 32*a* of the frame body 32. Accordingly, the image of the reference chart KC can be captured by the two-dimensional image sensor 35 of the image sensor unit 34 at the same focal length as that for the targets for image capture such as the recording medium P. The reference chart KC is set in a detachable manner on the depressed portion 32*d* formed on the outer circumference of the face toward the recording medium P at the opening 32*b* formed at the bottom face portion 32*a* of the frame body 32. The face of the reference chart KC toward the recording medium P is held in a detachable manner by the holding plate 32*e* mounted in a detachable manner on the depressed portion 32*d*. Accordingly, if dust or the like that has entered the frame body 32 adheres on the surface of the reference chart KC, the holding plate 32*e* and the reference chart KC can be dismounted, and mounted again after the reference chart KC is cleaned up. This improves accuracy of measurement of the reference chart KC.

Referring back to FIGS. 4 to 7, the image capturing unit 30 is provided with a pair of illumination light sources 37, on the base plate 31, that are arranged on the center line Lo passing in the sub-scanning direction through the center of the image sensor unit 34 and are located in positions apart in the sub-scanning direction by equal predetermined distances from the center of the image sensor unit 34. As the illumination light source 37, for example, a light-emitting diode (LED) is used. Note that the type of the illumination light source 37 is not limited to LEDs. For example, an organic EL device may be used as the illumination light source 37. If an organic EL device is used as the illumination light source 37, illumination light having a spectral distribution close to that of sunlight is expected to improve accuracy of color measurement.

The illumination light sources 37 are arranged on the center line Lo. As illustrated in FIG. 7, a diffusion plate (specular reflection preventing member) 40 is arranged in a predetermined position corresponding to the center line Lo and between the image sensor unit 34 and the bottom face portion 32*a*. The diffusion plate 40 is arranged with both ends thereof in the longitudinal direction (in the direction of the center line Lo) mounted on the side faces of the frame body 32 by a method of adhesion, engagement, screwing, or the like. The diffusion plate 40 has a width larger than that of specular reflection areas SA for the illumination light sources 37 toward the image sensor unit 34, and is formed, on the side thereof toward the illumination light sources 37, with a plurality of diffusing surfaces 40*a* illustrated in FIG. 9. The diffusing surfaces 40*a* are symmetrically formed in the main-scanning direction from the central position (position directly below the image sensor unit 35). The diffusing surfaces 40*a* are inclined plates that diffuse incident light from the illumination light sources 37 to directions not toward the image sensor unit 34, as indicated by dashed-line arrows in FIG. 7. The diffusing surfaces 40*a* each only need to have a shape that can prevent the light from the illumination light sources 37 from being specularly reflected toward the image sensor unit 35, and is not limited to having the above-described shape. The diffusing surfaces 40*a* may be treated by treatment such as light absorption treatment by which the surfaces absorb light by being black-colored or the like, or diffuse reflection treatment by which the surfaces are made finely fibrous to reflect light diffusely.

The diffusion plate 40 can prevent the incident light from the illumination light sources 37 from directly entering the two-dimensional image sensor 35 of the image sensor unit 34, in other words, can prevent the light from the illumination light sources 37 from being specularly reflected into the two-dimensional image sensor 35. Providing the diffusion plate 40 can therefore prevent faulty images caused by the specularly reflected light of the illumination light sources 37 from being included in the images of the reference color patches KP, the color measurement adjusting color patches CP, and the reference chart KC captured by the image sensor unit 34, so as to enable highly accurate color measurement.

In the image capturing unit 30, the opening 32*c* for the image capturing area and the reference chart KC are arranged, as a layout condition thereof, substantially symmetrically with each other with respect to the center line Lo connecting the center of the lens 36 and the illumination light sources 37. Accordingly, image capturing conditions of the two-dimensional image sensor 35 can be line-symmetric, which improves accuracy of the two-dimensional image sensor 35 in color adjustment processing and color measuring processing that use the reference chart KC.

In the image capturing unit 30, the illumination light that illuminates an image capture surface of the recording medium P through the opening 32*c* and the illumination light that illuminates the reference chart KC are from the same illumination light sources 37, and thus, the images of the reference chart KC and the image capture surface of the recording medium P can be simultaneously captured under the same illumination condition. In other words, the illumination light sources 37 illuminating the image capture object are always illuminating the reference chart KC, and therefore can illuminate the reference chart KC and the image capture object on the recording medium P under substantially the same illumination condition, thus making it possible to capture the images of the reference chart KC and the image capture object under substantially the same illumination condition.

Figure 10:
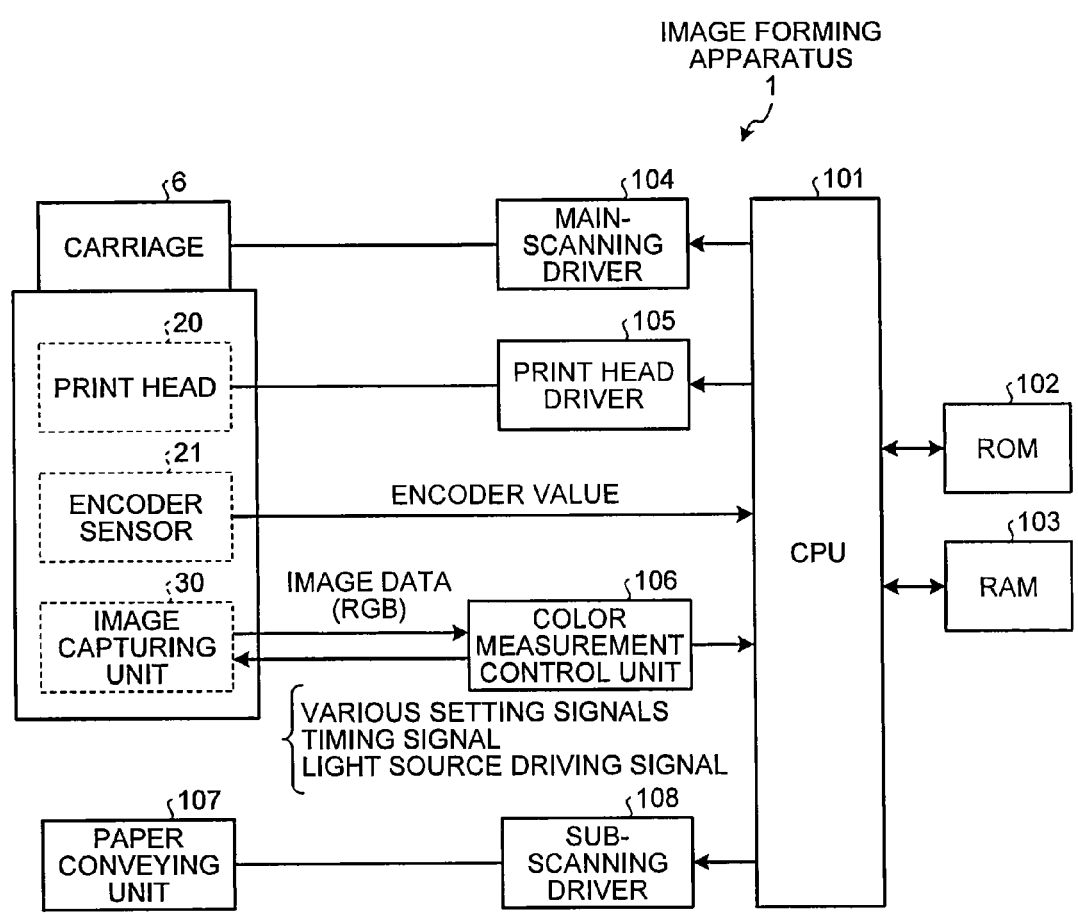
FIG. 10 is an essential part block configuration diagram of the image forming apparatus.

The image forming apparatus 1 of the present embodiment has a block configuration illustrated in FIG. 10. The image forming apparatus 1 is provided with a central processing unit (CPU) 101, a read-only memory (ROM) 102, a random access memory (RAM) 103, a main-scanning driver 104, a print head driver 105, the color measurement control unit 106, a paper conveying unit 107, a sub-scanning driver 108, and the like, and is also provided, as described above, with the print head 20, the encoder sensor 21, the image capturing unit 30, and the like that are mounted on the carriage 6.

The ROM 102 stores therein computer programs such as a basic program serving as the image forming apparatus 1 and a color adjustment processing program, necessary system data, and the like. The CPU 101 executes, based on the programs in the ROM 102, a basic process serving as the image forming apparatus 1 by controlling various units of the image forming apparatus 1 while using the RAM 103 as a work memory. The CPU 101 executes the color adjustment processing at the time of image forming based on the color measurement values obtained in the color measuring process in the color measurement control unit 106.

When controlling the carriage 6 and the paper conveying unit 107, the CPU 101 controls drive of the main-scanning driver 104 based on encoder values from the encoder sensor 21 so as to control movement of the carriage 6 in the main-scanning direction. The CPU 101 controls drive of the paper conveying unit 107 including a sub-scanning motor and carriage rollers (both not illustrated) via the sub-scanning driver 108. The CPU 101 controls, via the print head driver 105, timing and amount of ink discharged by the print head 20. The CPU 101 controls lighting drive of the illumination light sources 37 of the image capturing unit 30 via the color measurement control unit 106.

The image capturing unit 30 captures the images of the color measurement adjusting color patches CP formed by the print head 20 at the time of the color measurement and outputs RGB values of the captured images to the color measurement control unit 106, as will be described below, in order to generate, as described above, the color measurement values for the color adjustment to reproduce colors of the image data at the recording and outputting of the image to correctly coincide with colors intended by a user. Note that, although the present embodiment configures the color measurement control unit 106 to be separate from the image capturing unit 30, the color measurement control unit 106 may be integrated with the image capturing unit 30. For example, a control circuit functioning as the color measurement control unit 106 may be mounted on the base plate 31 of the image capturing unit 30.

Figure 11:
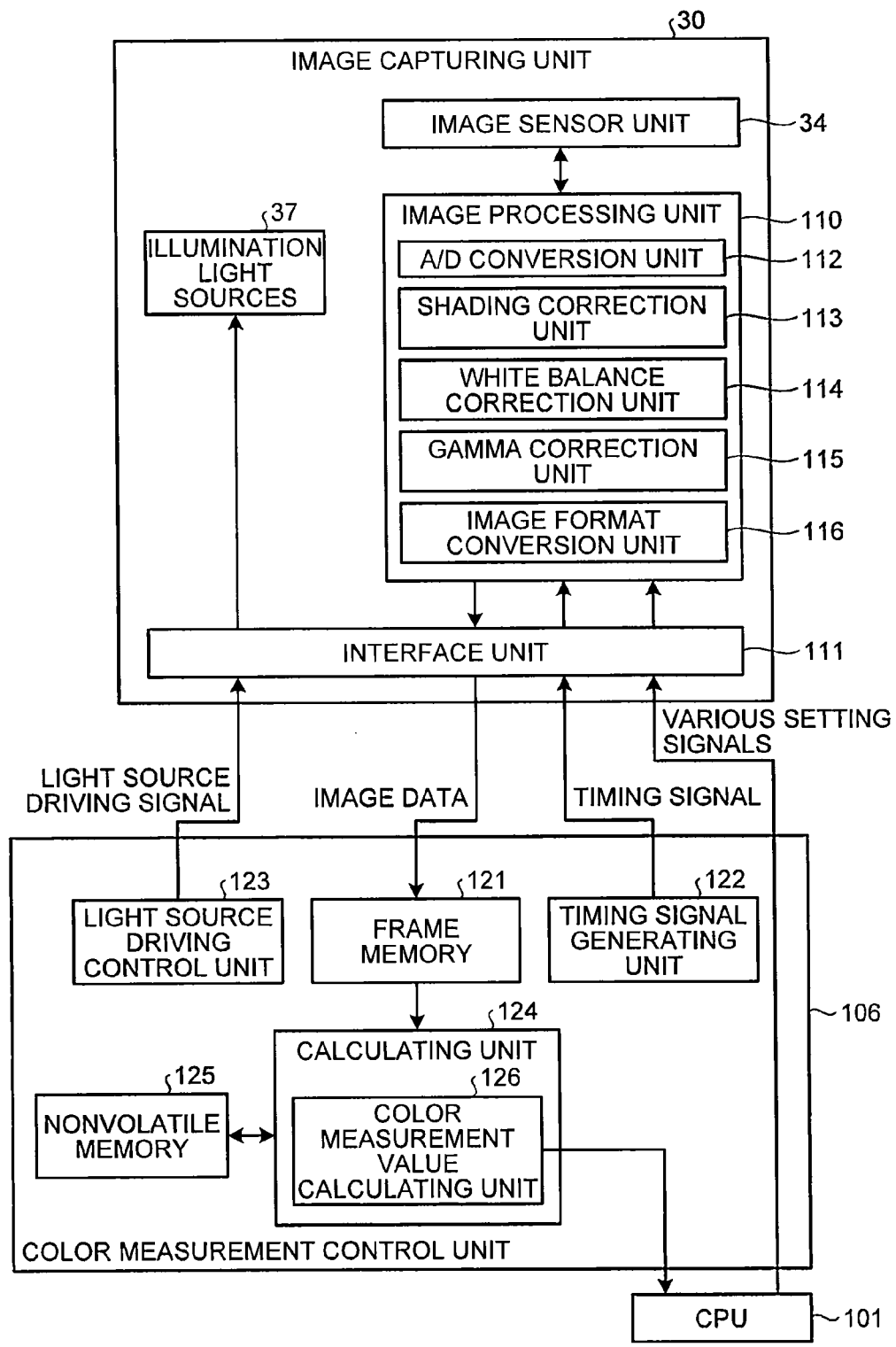
FIG. 11 is a block configuration diagram of the image capturing unit and a color measurement control unit.

The image capturing unit 30 and the color measurement control unit 106 have block configurations illustrated in FIG. 11. The image capturing unit 30 is provided with the illumination light sources 37 and the image sensor unit 34 which are described above, and is also provided with an image processing unit 110 and an interface unit 111. The image processing unit 110 is provided with an A/D conversion unit 112, a shading correction unit 113, a white balance correction unit 114, a gamma correction unit 115, and an image format conversion unit 116. Note that, although the present embodiment configures the image processing unit 110 to be separate from the image sensor unit 34, the two-dimensional image sensor 35 of the image sensor unit 34 may have the function of the image processing unit 110.

The image capturing unit 30 outputs, to the image processing unit 110, analog RGB image data obtained by the image sensor unit 34 by simultaneously capturing the images of the image capture object and the reference chart KC. The image processing unit 110 applies necessary image processing to the analog RGB image data sent from the image sensor unit 34, and outputs the processed image data to the color measurement control unit 106.

The A/D conversion unit 112 of the image processing unit 110 converts the analog RGB image data supplied from the image sensor unit 34 into digital data, and outputs the digital data to the shading correction unit 113.

The shading correction unit 113 applies correction to the RGB image data supplied from the A/D conversion unit 112 so as to correct errors in the image data caused by unevenness in illuminance of the illumination light from the illumination light sources 37 to the image capture range of the image sensor unit 34, and outputs the corrected image data to the white balance correction unit 114.

The white balance correction unit 114 corrects white balance of the RGB image data after the shading correction, and outputs the image data after the white balance correction to the gamma correction unit 115.

The gamma correction unit 115 corrects the image data supplied from the white balance correction unit 114 so as to compensate linearity in sensitivity of the image sensor unit 34, and outputs the corrected image data to the image format conversion unit 116.

The image format conversion unit 116 converts the image data after the gamma correction to any desired format, and outputs the converted image data to the color measurement control unit 106 via the interface unit 111.

The interface unit 111 is an interface through which the image capturing unit 30 acquires various setting signals, a timing signal, and a light source drive signal that are sent from the color measurement control unit 106, and then sends the image data to the color measurement control unit 106.

The color measurement control unit 106 is provided with a frame memory 121, a timing signal generating unit 122, a light source driving control unit 123, a calculating unit 124, and a nonvolatile memory 125. The calculating unit 124 is provided with a color measurement value calculating unit 126.

The frame memory 121 is a memory that temporarily stores therein the image data sent from the image capturing unit 30, and outputs the stored image data to the calculating unit 124.

Figure 12:
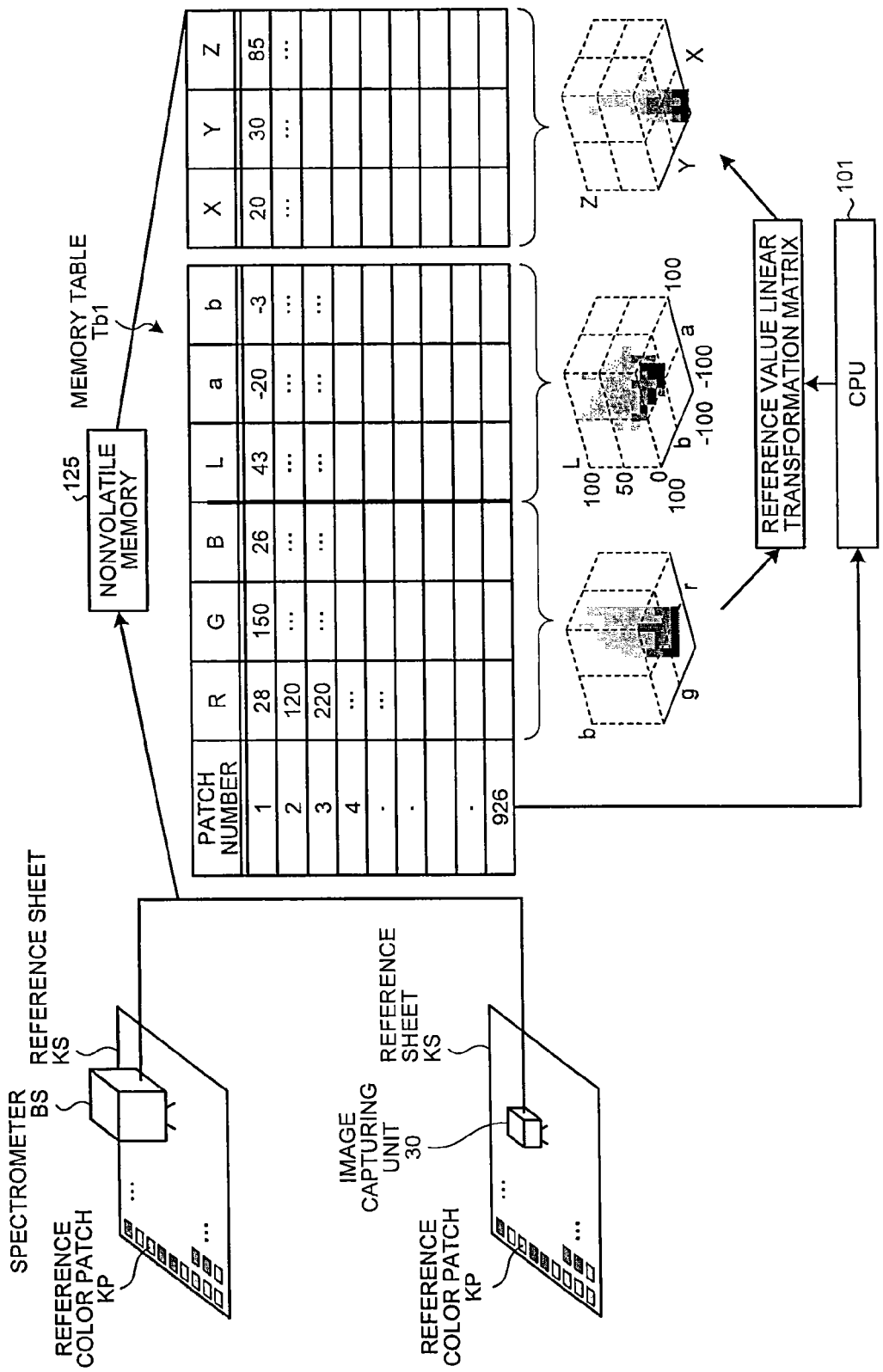
FIG. 12 is an explanatory diagram of a process of acquiring reference color measurement values and image capturing reference RGB values from a reference sheet and a process of acquiring a reference value linear transformation matrix.

As illustrated in FIG. 12, the nonvolatile memory 125 stores, as reference color measurement values, at least either of Lab values and XYZ values (in FIG. 12, both of Lab values and XYZ values) which are read by the spectrometer BS as the color measurement values of the color measurement results of the reference color patches KP arranged on the reference sheet KS. The reference color measurement values are stored in a memory table Tb1 in the nonvolatile memory 125 in a manner corresponding to patch numbers.

While the reference color measurement values are stored in the memory table Tb1 in the nonvolatile memory 125 and the image forming apparatus 1 is in an initial state, the image forming apparatus 1 sets the above-mentioned reference sheet KS on the platen 14, and controls movement of the carriage 6 to read, using the image capturing unit 30, the same reference color patches KP of the reference sheet KS as those read by the spectrometer BS so as to obtain image capturing reference RGB values, and stores the image capturing reference RGB values in the memory table Tb1 in the nonvolatile memory 125 in a manner corresponding to the patch numbers, that is, in a manner corresponding to the reference color measurement values. The image forming apparatus 1 captures images of the patches of the reference chart KC of the image capturing unit 30 to obtain RGB values, and stores, under control of the calculating unit 124, the RGB values of the patches of the reference chart KC in the memory table Tb1 in the nonvolatile memory 125 as initial reference RGB values RdGdBd.

After the image forming apparatus 1 has stored the reference color measurement values, the image capturing reference RGB values, and the initial reference RGB values RdGdBd in the nonvolatile memory 125, the color measurement value calculating unit 126 calculates a reference value linear transformation matrix that performs transformation between the pair of the XYZ values of the reference color measurement values and the image capturing reference RGB values stored in the nonvolatile memory 125, that is, between the pair of the XYZ values and the image capturing reference RGB values corresponding to the same patch number, and stores the calculated reference value linear transformation matrix in the nonvolatile memory 125.

The image forming apparatus 1 executes the above-described processing while the image forming apparatus 1 is in the initial state, and registers, in the memory table Tb1 in the nonvolatile memory 125, the reference color measurement values, the image capturing reference RGB values, and the initial reference RGB values RdGdBd which are results of the execution. Thereafter, the image forming apparatus 1 calculates the reference value linear transformation matrix, and stores it in the nonvolatile memory 125.

As will be described later, at the time of the color adjustment processing, the image forming apparatus 1 simultaneously images, with the image sensor unit 34, the color measurement adjusting color patches CP serving as an image capture object formed on the recording medium P by the print head 20 that has changed with time or the like and the reference chart KC disposed in the frame body 32. The image forming apparatus 1 then outputs image data including the color measurement adjusting color patches CP and the reference chart KC to the color measurement control unit 106. Based on the initial reference RGB values RdGdBd of the patches Pa to Pe of the reference chart KC that have been read and stored simultaneously when the reference color patches (hereinafter called initial reference color patches) of the reference sheet KS have been read by the image capturing unit 30, and on the RGB values (hereinafter called color-measurement-time reference RGB values) of the patches Pa to Pe of the reference chart KC, the images of which have been captured simultaneously with the color measurement adjusting color patches CP at the time of the color adjustment processing, the color measurement control unit 106 transforms the RGB values of the color measurement adjusting color patches CP obtained from the image capturing unit 30. Thereafter, the color measurement control unit 106 performs the color measuring process to obtain the color measurement values of the color measurement adjusting color patches CP.

In other words, the calculating unit 124 controls operation of the color measurement control unit 106, and the color measurement value calculating unit 126 performs the color measuring process and outputs, to the CPU 101, the color measurement values which are processing results of the color measuring process. The CPU 101 uses the color measurement values to apply the color adjustment processing to the image data, and based on the image data processed by the color adjustment processing, controls the print head 20 so as to perform image formation in the state of improved color reproducibility.

The image forming apparatus 1 of the present embodiment is provided with the color measuring device. The color measuring device reads a color measurement program that executes the color measurement method of the present embodiment from a computer-readable recording medium recording the color measurement program, such as a ROM, an electrically erasable and programmable read-only memory (EEPROM), an EPROM, a flash memory, a flexible disk, a compact disc read-only memory (CD-ROM), a compact disc rewritable (CD-RW), a digital versatile disc (DVD), a secure digital (SD) card, and a magneto-optical disk (MO), and introduces the color measurement program into the ROM 102 or the nonvolatile memory 125 so as to execute the color measurement method that achieves color reproducibility (to be described later) in a low-cost and stable manner. The color measurement program is a computer-executable program described in a legacy programming language such as an assembly language, C, C++, C#, or Java (registered trademark), in an object-oriented programming language, or in other programming languages, and can be distributed by being stored in the above-mentioned recording medium.

Next, operation of the present embodiment will be described. The image forming apparatus 1 of the present embodiment executes the color measurement method for achieving color reproducibility in a low-cost and stable manner.

As illustrated in FIG. 12, the image forming apparatus 1 of the present embodiment stores, as reference color measurement values, at least either of the Lab values and the XYZ values, which are read by the spectrometer BS as the color measurement values of the color measurement results of the reference color patches formed in an arranged manner on the reference sheet KS, in the memory table Tb1 in the nonvolatile memory 125 in a manner corresponding to the patch numbers.

Figure 13:
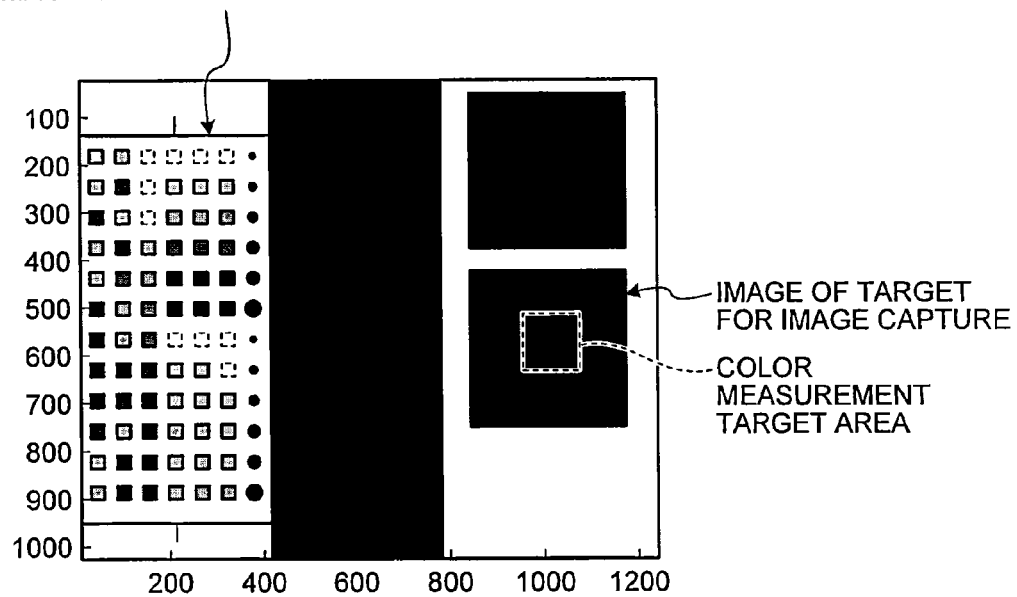
FIG. 13 is a diagram illustrating an example of image data obtained by simultaneously capturing images of the reference chart and a target for image capture.

While the reference color measurement values are stored in the memory table Tb1 in the nonvolatile memory 125 and the image forming apparatus 1 is placed in the initial state for the reason of manufacturing, overhaul, or the like, the image forming apparatus 1 sets the above-mentioned reference sheet KS on the platen 14, and controls the movement of the carriage 6 to image, using the image capturing unit 30, the same reference color patches of the reference sheet KS as those read by the spectrometer BS, and at the same time, captures the images of the patches (initial reference color patches) of the reference chart KC arranged in the frame body 32 as illustrated in FIG. 13.

Figures 14A, 14B:
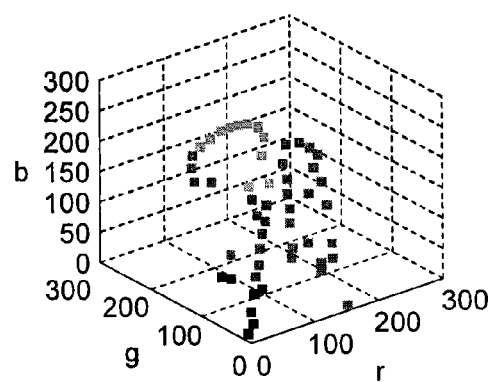
FIGS. 14A and 14B are diagrams illustrating an example of initial reference RGB values.

After the images of the reference color patches of the reference sheet KS and the patches of the reference chart KC are captured by the image capturing unit 30, the calculating unit 124 of the color measurement control unit 106 stores the image capturing reference RGB values which are RGB values obtained by processing, in the image processing unit 110, the image data obtained by capturing the images of the reference color patches of the reference sheet KS, that is, device-dependent signals that depend on the device, in the memory table Tb1 in the nonvolatile memory 125 in a manner corresponding to the patch numbers, that is, in a manner corresponding to the reference color measurement values, as illustrated in FIG. 12. The calculating unit 124 of the color measurement control unit 106 also stores, in the nonvolatile memory 125, the initial reference RGB values RdGdBd which are RGB values obtained by processing, in the image processing unit 110, the image data obtained by capturing the images of the initial reference color patches of the reference chart KC, as illustrated in FIG. 14A.

Note that the calculating unit 124 calculates the initial reference RGB values RdGdBd as average values in each predetermined area, such as the area (color measurement target area) indicated by the dashed line in FIG. 13, out of the image data of the initial reference color patches of the reference chart KC read by the image capturing unit 30. By calculating the initial reference RGB values RdGdBd by averaging many pixels in the color measurement target area in this manner, it is possible to reduce an influence of noise and to improve bit resolution. FIG. 14B is a scatter diagram plotting the initial reference RGB values RdGdBd, and FIG. 14A illustrates a state in which the nonvolatile memory 125 has registered therein reference Lab values Ldadbd which are obtained by transforming the initial reference RGB values RdGdBd into Lab values and reference XYZ values xdydzd which are obtained by transforming the initial reference RGB values RdGdBd into XYZ values.

After the reference color measurement values, the image capturing reference RGB values, and the initial reference RGB values RdGdBd are stored in the nonvolatile memory 125, the color measurement value calculating unit 126 of the calculating unit 124 calculates the reference value linear transformation matrix that performs transformation between the pair of the XYZ values of the reference color measurement values and the image capturing reference RGB values stored in the nonvolatile memory 125, that is, between the pair of the XYZ values and the image capturing reference RGB values corresponding to the same patch number, and stores the calculated reference value linear transformation matrix in the nonvolatile memory 125.

In this state, based on externally supplied image data, print settings, and the like, the CPU 101 controls the main-scanning movement of the carriage 6, the conveying of the recording medium P by the paper conveying unit 48, and the drive of the print head 20, and thus controls the discharge of ink from the print heads 20*y*, 20*m*, 20*c*, and 20*k* of the print head 20 while intermittently conveying the recording medium P so as to record and output the image onto the recording medium P.

At this time, the discharge amounts of ink from the print heads 20*y*, 20*m*, 20*c*, and 20*k* can vary depending on device-specific characteristics, due to time-dependent change, or by other causes. This change in the discharge amounts of ink causes an image to be formed in colors different from colors intended by the user for the image, thus degrading color reproducibility.

Therefore, at predetermined times of color adjustment processing, the image forming apparatus 1 obtains color measurement values, and performs the color adjustment processing of adjusting the colors based on the color measurement values.

Figure 15:
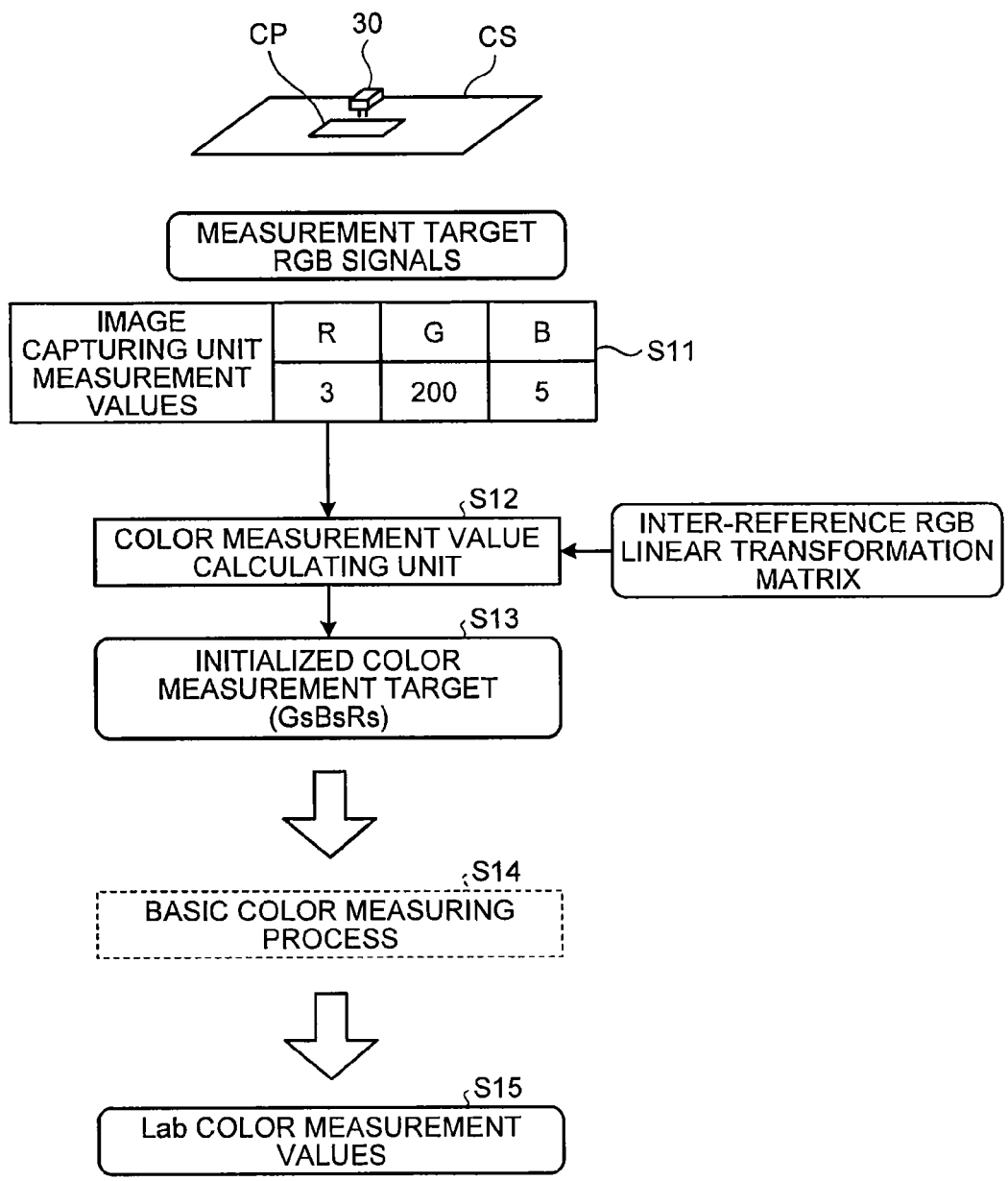
FIG. 15 is an explanatory diagram of a color measuring process.

Specifically, when a time for the color adjustment processing comes, the image forming apparatus 1 forms the color patches (color measurement adjusting color patches) CP on the recording medium P through the print head 20 so as to record and output the color patches as the color measurement adjusting sheet CS, as illustrated in FIG. 15. This color measurement adjusting sheet CS is a sheet onto which the color measurement adjusting color patches CP serving as a plurality of color patches for adjusting the color measurement are formed and output by the print head 20. The color measurement adjusting sheet CS is formed thereon with the color measurement adjusting color patches CP that reflect output characteristics of the image forming apparatus 1, particularly output characteristics of the print head 20, at the time of the color adjustment processing. Note that color patch data of the color measurement adjusting color patches CP is stored in advance in the nonvolatile memory 125, or the like.

The image forming apparatus 1 then uses, as will be described later, the RGB values obtained by capturing the images of the color measurement adjusting color patches CP of the color measurement adjusting sheet CS as color measurement target RGB values (RGB values for color measurement), and transforms the color measurement target RGB values into the initial reference RGB values RdGdBd. The image forming apparatus 1 then selects, out of the reference color measurement values registered in the memory table Tb1 in the nonvolatile memory 125, reference color measurement values (neighborhood reference color measurement values) that are near in distance to the color measurement values obtained by transforming the initial reference RGB values RdGdBd. The image forming apparatus 1 then obtains a selected RGB value linear transformation matrix that transforms image capturing reference RGB values corresponding to the selected neighborhood reference color measurement values into the neighborhood reference color measurement values, and uses the selected RGB value linear transformation matrix to transform the color measurement target RGB values so as to obtain the color measurement values. Then, based on the image data color-converted based on the color measurement values, the image forming apparatus 1 outputs the image through the print head 20. This improves the color reproducibility of the image formed by the image forming apparatus 1.

As illustrated in FIG. 15, in the state in which the color measurement adjusting sheet CS is set on the platen 14, or in the state in which the color measurement adjusting sheet CS is held on the platen 14 without being discharged after being recorded, the image forming apparatus 1 controls the movement of the carriage 6 to capture the images of the color measurement adjusting color patches CP of the color measurement adjusting sheet CS on the platen 14 by using the image capturing unit 30, and at the same time, captures the images of the patches of the reference chart KC by using the image capturing unit 30. After the image capturing unit 30 simultaneously captures the images of the color measurement adjusting color patches CP of the color measurement adjusting sheet CS and the patches of the reference chart KC, the image processing unit 110 of the image capturing unit 30 applies the necessary image processing to the image data of the color measurement adjusting color patches CP of the color measurement adjusting sheet CS and the image data of the patches of the reference chart KC, and thereafter, the image data (RGB values) of the color measurement adjusting color patches CP of the color measurement adjusting sheet CS is sent to the color measurement control unit 106 as the color measurement target RGB values, that is, as device-dependent signals that depend on the device. The image data (RGB values) of the patches of the reference chart KC is sent to the color measurement control unit 106 as color-measurement-time reference RGB values RdsGdsBds. The color measurement control unit 106 temporarily stores the color measurement target RGB values in the frame memory 121 (Step S11), as illustrated in FIG. 15.

In the color measurement control unit 106, the color measurement value calculating unit 126 of the calculating unit 124 transforms the color measurement target RGB values stored in the frame memory 121 into initialized color measurement target RGB values RsGsBs by using an inter-reference-RGB linear transformation matrix to be described later (Steps S12 and S13).

The calculating unit 124 of the color measurement control unit 106 uses the transformed initialized color measurement target RGB values RsGsBs as color measurement target RGB values (Step S14) to perform a basic color measuring process to be described later, and thus obtains Lab color measurement values (Step S15).

Figure 16:
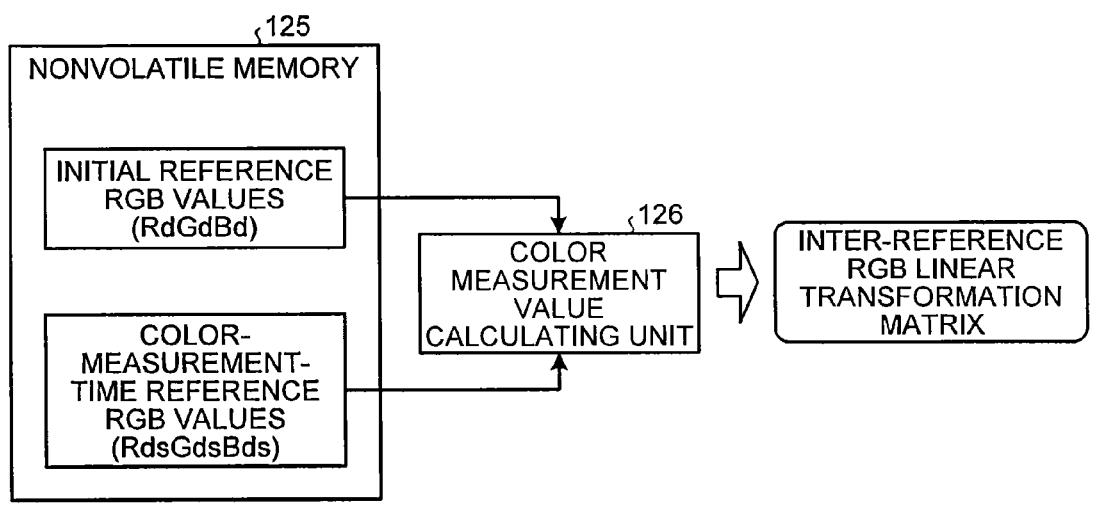
FIG. 16 is an explanatory diagram of a process of generating an inter-reference RGB linear transformation matrix.
Figure 17:
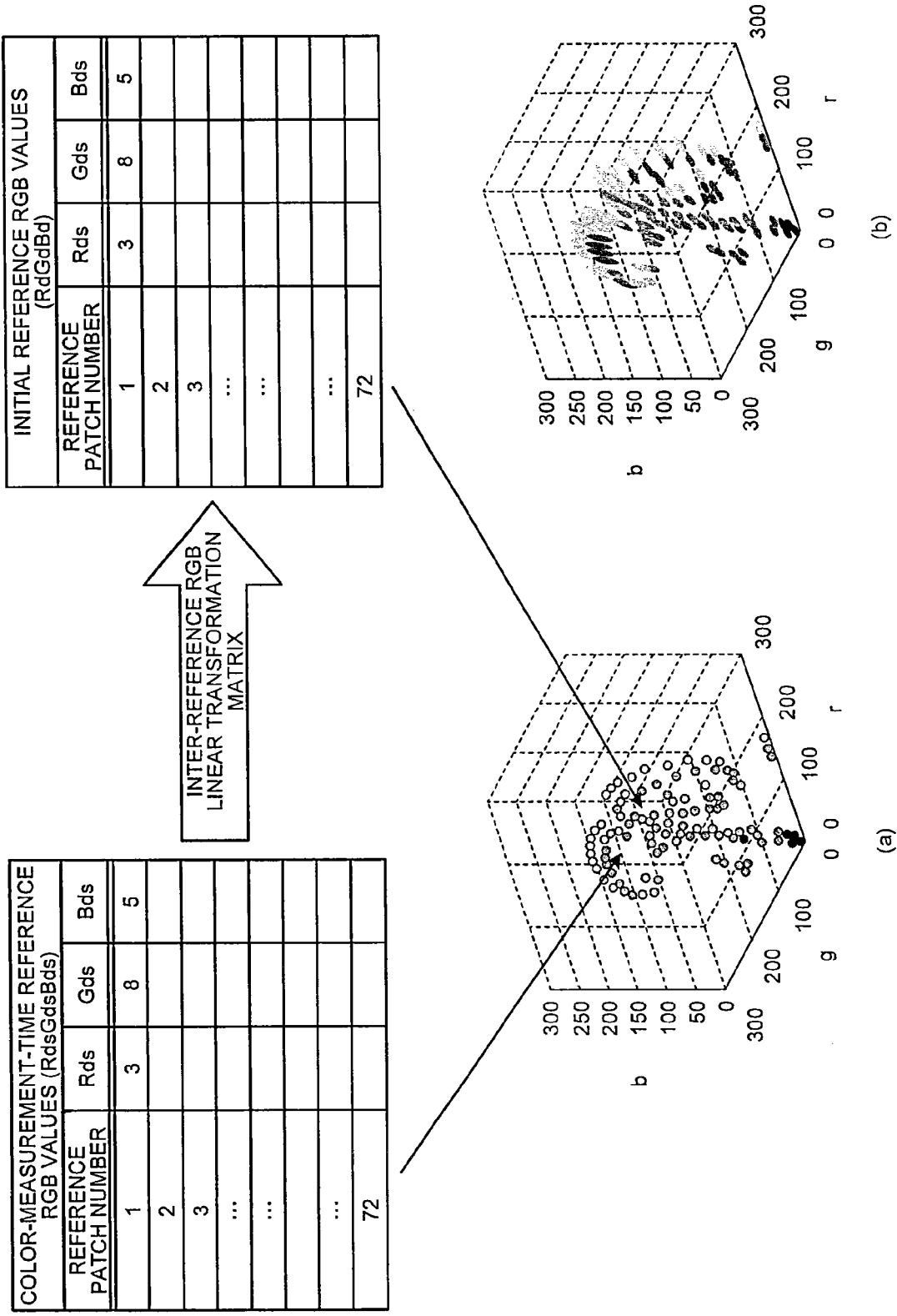
FIG. 17 is a diagram illustrating a relation between the initial reference RGB values and color-measurement-time reference RGB values.

In the image forming apparatus 1 of the present embodiment, the color measurement value calculating unit 126 of the calculating unit 124 then obtains the above-mentioned inter-reference-RGB linear transformation matrix as illustrated in FIGS. 16 and 17.

Specifically, as illustrated in FIG. 16, the color measurement value calculating unit 126 of the calculating unit 124 reads the initial reference RGB values RdGdBd and the color-measurement-time reference RGB values RdsGdsBds from the nonvolatile memory 125. The initial reference RGB values RdGdBd are obtained at the initial time by capturing the images of the patches of the reference chart KC using the image capturing unit 30 at the same time of capturing the images of the reference color patches KP of the reference sheet KS, and are stored in the nonvolatile memory 125. The color-measurement-time reference RGB values RdsGdsBds are obtained at the time of color measurement by capturing the images of the patches of the reference chart KC using the image capturing unit 30 at the same time of capturing the images of the color measurement adjusting color patches CP of the color measurement adjusting sheet CS, and are stored in the nonvolatile memory 125. The color measurement value calculating unit 126 of the calculating unit 124 obtains the inter-reference-RGB linear transformation matrix that transforms the color-measurement-time reference RGB values RdsGdsBds into the initial reference RGB values RdGdBd, and stores the obtained inter-reference-RGB linear transformation matrix in the nonvolatile memory 125.

Specifically, in diagram (a) of FIG. 17, the initial reference RGB values RdGdBd are plotted in an RGB space as points illustrated by white dots, and the color-measurement-time reference RGB values RdsGdsBds are plotted in the RGB space as points illustrated by filled dots. As found from diagram (a) of FIG. 17, the color-measurement-time reference RGB values RdsGdsBds are changed from the initial reference RGB values RdGdBd. As illustrated by arrows in diagram (b) of FIG. 17, the directions of the changes of these values in the RGB space are roughly the same, but the directions of the shifts differ depending on hue. In this manner, the RGB values obtained by capturing the images of the same patches of the reference chart KC vary because of time-dependent change of the illumination light sources 37, time-dependent change of the two-dimensional image sensor 35, and the like.

In the state in which the RGB values obtained by capturing the images of the same patches of the reference chart KC vary in this manner, if color measurement values are obtained using the color measurement target RGB values obtained when the images of the color measurement adjusting color patches CP of the color measurement adjusting sheet CS are captured, errors can be generated in the color measurement values by amounts of the changes.

Accordingly, the color measurement value calculating unit 126 applies an estimation method such as a least-square method to a relation between the initial reference RGB values RdGdBd and the color-measurement-time reference RGB values RdsGdsBds so as to obtain the inter-reference-RGB linear transformation matrix which transforms the color-measurement-time reference RGB values RdsGdsBds into the initial reference RGB values RdGdBd. Using the inter-reference-RGB linear transformation matrix, the color measurement value calculating unit 126 transforms, into the initialized color measurement target RGB values RsGsBs, the color measurement target RGB values which have been obtained by capturing the images of the color measurement adjusting color patches CP of the color measurement adjusting sheet CS using the image capturing unit 30 and are stored in the nonvolatile memory 125. Then, using the transformed initialized color measurement target RGB values RsGsBs as the color measurement target RGB values, the color measurement value calculating unit 126 performs the basic color measuring process to be described later, to obtain the Lab color measurement values.

The inter-reference-RGB linear transformation matrix is not necessarily linear but may be a higher-order nonlinear matrix. If there is high nonlinearity between the RGB space and the XYZ space, a higher-order matrix can improve accuracy of transformation.

When the above-described image capturing unit 30 captures the images of the reference color patches KP of the reference sheet KS and the color measurement adjusting color patches CP of the color measurement adjusting sheet CS serving as image capture objects through the opening 32c formed at the bottom face portion 32a, the image capturing unit 30 simultaneously captures the images of the patches of the reference sheet KS arranged at the opening 32c of the bottom face portion 32a of the frame body 32. With this operation, the image capturing unit 30 can always capture the images of the patches of the reference sheet KS in the same positional relation with the reference color patches KP of the reference sheet KS and the color measurement adjusting color patches CP of the color measurement adjusting sheet CS serving as the image capture objects, and thus can perform the image capture in a stable state.

The image capturing unit 30 is also provided with the diffusion plate 40 which lies in the frame body 32 and is arranged in the specular reflection areas SA for the illumination light sources 37 toward the image sensor unit 35. As indicated by dashed-line arrows in FIG. 7, the diffusion plate 40 reflects the incident light from the illumination light sources 37 in directions other than that toward the image sensor unit 35.

Accordingly, it is possible to prevent faulty images caused by the specularly reflected light of the illumination light sources 37 from being included in the images of the reference color patches KP, the color measurement adjusting color patches CP, and the reference chart KC captured by the image sensor unit 34, so as to achieve highly accurate color measurement.

The illumination light from the same illumination light sources 37 serves as both the illumination light that irradiates the image capture surface of the recording medium P through the opening 32c and the illumination light that irradiates the reference chart KC. Accordingly, the image capturing unit 30 can simultaneously capture the image of the reference chart KC and the image capture surface of the recording medium P under the same illumination condition. The illumination light sources 37 are arranged on the center line Lo which lies in a substantially intermediate position between the reference chart KC and the recording medium P, and the two illumination light sources 37 are arranged on the center line Lo symmetrically with respect to the lens 36. The illumination light sources 37 can thus uniformly illuminate the reference chart KC and the image capturing area on the recording medium P under substantially the same condition.

In the image capturing unit 30, the opening 32c for the image capturing area and the reference chart KC are arranged, as a layout condition thereof, substantially symmetrically with respect to the center line Lo connecting the center of the lens 36 and the illumination light sources 37. Accordingly, in the image capturing unit 30, the image capturing conditions of the two-dimensional image sensor 35 can be line-symmetric, which improves the accuracy of the two-dimensional image sensor 35 in the color adjustment processing and the color measuring processing which use the reference chart KC.

Figure 18:
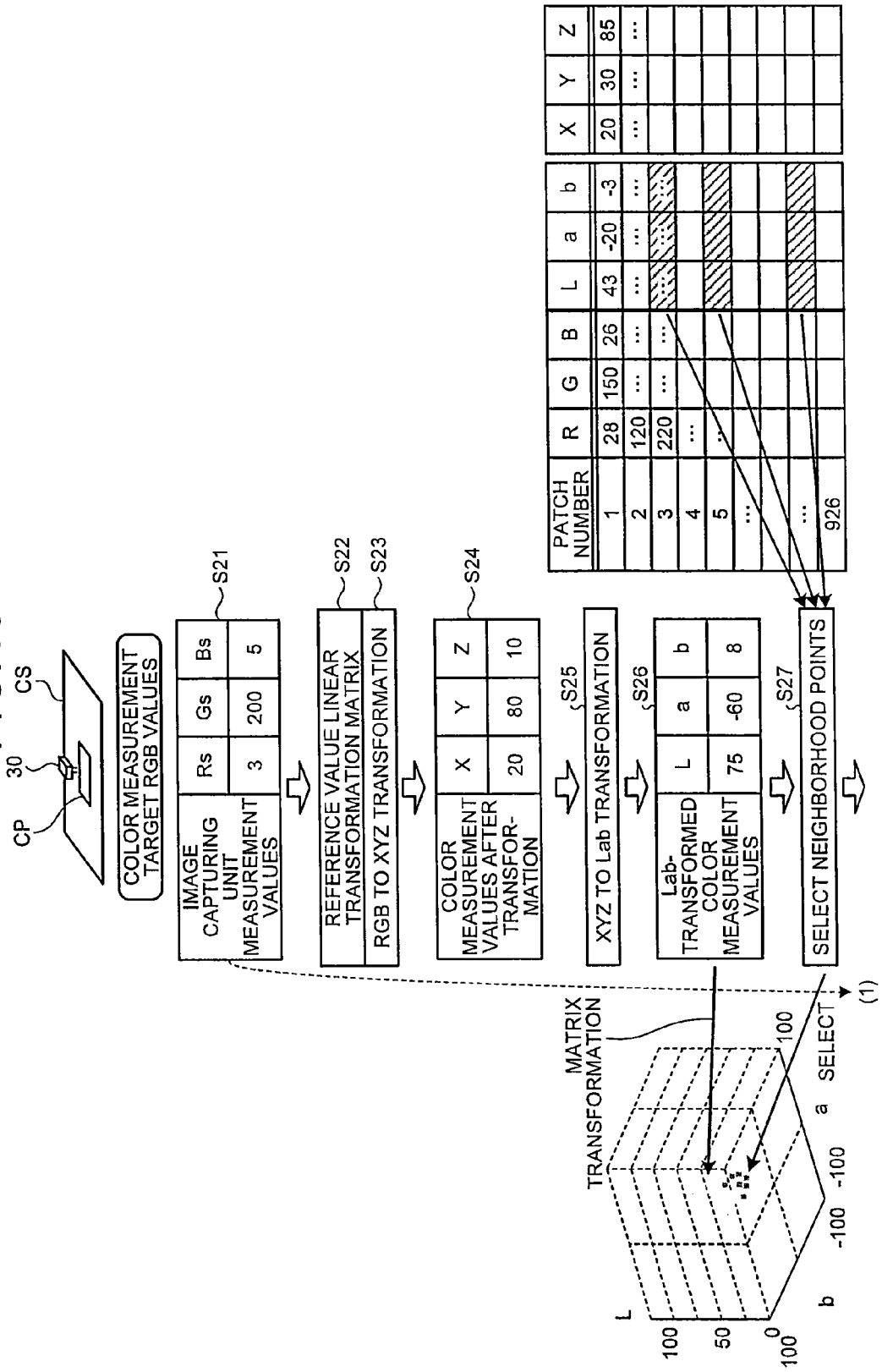
FIG. 18 is an explanatory diagram of a basic color measuring process.
Figure 19:
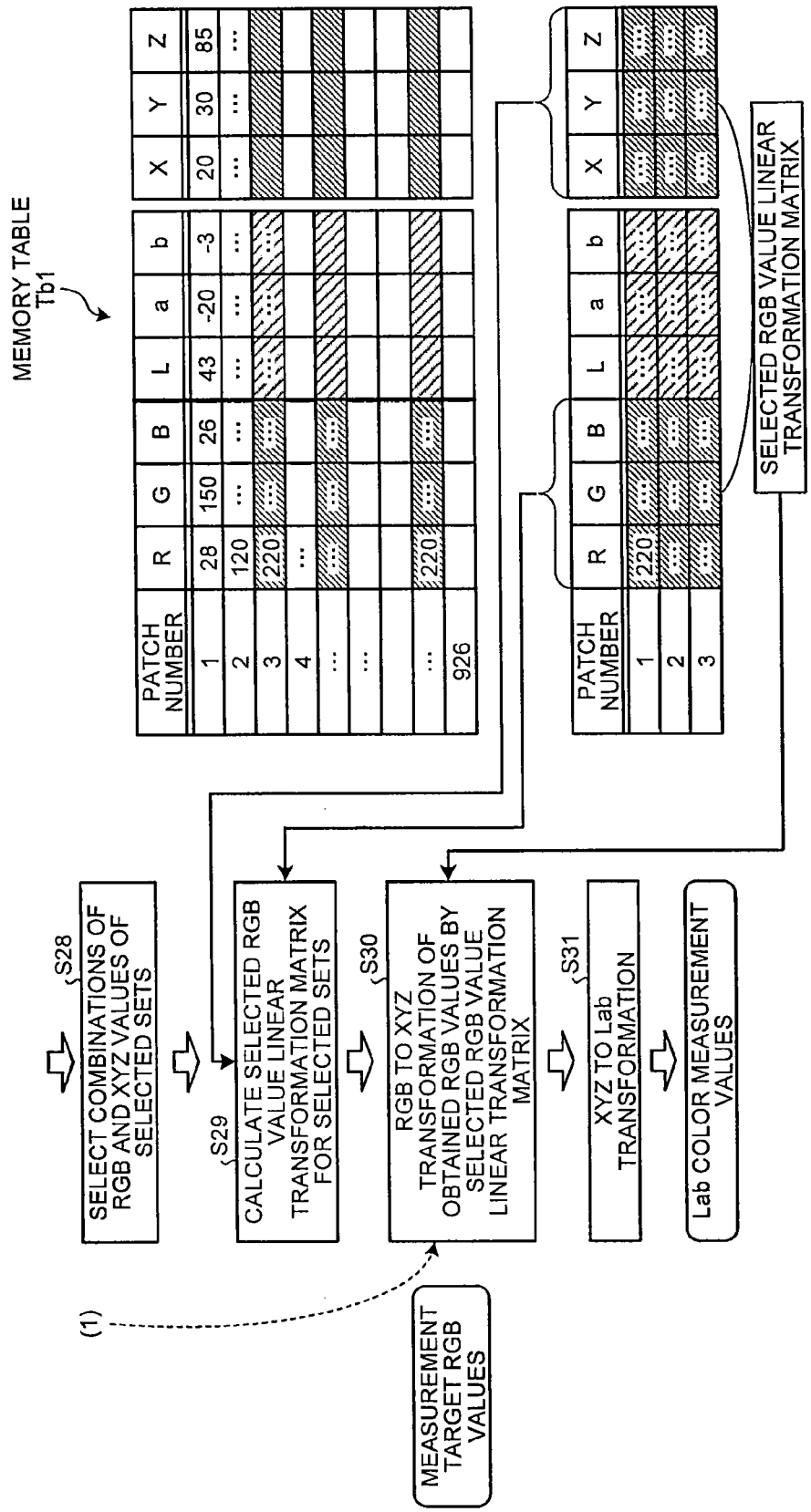
FIG. 19 is a diagram illustrating the basic color measuring process continued from FIG. 18.

Then, after obtaining the initialized color measurement target RGB values RsGsBs as the color measurement target RGB values as described above, the color measurement value calculating unit 126 selects, out of the reference color measurement values registered in the memory table Tb1 in the nonvolatile memory 125, the reference color measurement values (neighborhood reference color measurement values) that are near in distance to the color measurement values which have been transformed into the color measurement target RGB values, as illustrated in FIGS. 18 and 19. The color measurement value calculating unit 126 then performs the basic color measuring process to obtain the color measurement values by transforming the color measurement target RGB values into the selected neighborhood reference color measurement values. Then, based on the image data color-converted based on the color measurement values, the image forming apparatus 1 outputs the image through the print head 20. This improves the color reproducibility of the image formed by the image forming apparatus 1.

Specifically, as illustrated in FIG. 18, after the image capturing unit 30 captures the images of the color measurement adjusting color patches CP of the color measurement adjusting sheet CS, and the nonvolatile memory 125 stores therein the color measurement target RGB values as described above (Step S21), the color measurement value calculating unit 126 uses the above-described reference value linear transformation matrix (Step S22) to transform the color measurement target RGB values into first XYZ values (Step S23), and stores the first XYZ values in the nonvolatile memory 125 (Step S24). For example, in FIG. 18, the color measurement value calculating unit 126 transforms the color measurement target RGB values (3, 200, 5) into the first XYZ values (first color measurement values) (20, 80, 10), and stores the first XYZ values in the nonvolatile memory 125.

Next, the color measurement value calculating unit 126 refers to the memory table Tb1 in the nonvolatile memory 125 or uses a known transformation equation to transform the first XYZ values into first Lab values (first color measurement values) (Step S25), and stores the first Lab values in the nonvolatile memory 125 (Step S26). For example, in FIG. 18, the color measurement value calculating unit 126 transforms the first XYZ values (20, 80, 10) into the first Lab values (75, −60, 8), which are captured image color measurement values.

Next, as illustrated by a Lab space in FIG. 18, the color measurement value calculating unit 126 searches for reference color measurement values (Lab values) of color patches of a plurality of colors in the memory table Tb1 stored in the nonvolatile memory 125, and selects, out of the reference color measurement values (Lab values), sets of a predetermined number of color patches (neighborhood color patches) that have reference color measurement values (Lab values) near in distance to the first Lab values in the Lab space (Step S27). For example, the diagram of the Lab space of FIG. 18 illustrates 60 color patches selected and plotted in the Lab space. The number (predetermined number) of the color patches to be selected is not limited to 60. For example, the following method is applicable for selecting the patches near in distance to the first Lab values: distances are calculated between the first Lab values and all points for the reference color measurement values (Lab values) of the color patches, and reference Lab values (in FIG. 18, reference Lab values with hatched lines) of color patches near in distance to the first Lab values (which are the first color measurement values) are selected.

Next, as illustrated in FIG. 19, referring to the memory table Tb1, the color measurement value calculating unit 126 selects combinations of image capturing reference RGB values paired with the first Lab values of the selected sets (that is, image capturing reference RGB values [selected RGB values] corresponding to the same patch numbers as those of the first Lab values of the selected sets) and reference XYZ values (Step S28). The color measurement value calculating unit 126 then uses the least-square method to obtain the selected RGB value linear transformation matrix for performing transformation between the sets of the image capturing reference RGB values and of the reference XYZ values of the selected combinations (selected sets), and stores the obtained selected RGB value linear transformation matrix in the nonvolatile memory 125 (Step S29).

Next, using the selected RGB value linear transformation matrix obtained as described above, the color measurement value calculating unit 126 obtains second XYZ values serving as second color measurement values from the color measurement target RGB values (Step S30). The color measurement value calculating unit 126 then uses a known transformation equation to transform the second XYZ values into second Lab values (Step S31), and obtains the second Lab values as final color measurement values (Step S32).

The image forming apparatus 1 performs image adjustment based on the image data color-converted with the color measurement values obtained by the color measurement value calculating unit 126, and drives the print head 20 to perform the image formation based on the image data processed by the image adjustment.

Specifically, from the color measurement target RGB values obtained by capturing the images of the color measurement adjusting color patches CP of the color measurement adjusting sheet CS that reflect the output characteristics of the print head 20 at the time of the color adjustment processing, the image forming apparatus 1 of the present embodiment computes, using the reference value linear transformation matrix, the first Lab values when the image of the reference sheet KS is captured in the initial state. The image forming apparatus 1 then selects, out of the reference Lab values of the patches of a plurality of colors registered in the memory table Tb1, sets of patches having reference Lab values near in distance to the first Lab values in the Lab space, and transforms the color measurement target RGB values corresponding to the selected reference Lab values into Lab values by using the selected RGB value linear transformation matrix so as to obtain the Lab color measurement values. The image forming apparatus 1 then performs the image adjustment based on the image data color-converted with the color measurement values thus obtained, and drives the print head 20 to perform the image formation based on the image data processed by the image adjustment.

The image capturing unit 30 provided in the image forming apparatus 1 of the present embodiment has the image sensor unit (sensor unit) 34 that captures the image of a predetermined area including the image capture object; the reference chart (reference chart portion) KC that is disposed in the predetermined area serving as the image capturing area of the image sensor unit 34 and the image of which is captured together with an image of the image capture object by the image sensor unit 34; the illumination light sources 37 that illuminate the image capture object and the reference chart KC; and the diffusion plate (specular reflection preventing member) 40 that prevents that specular reflection light of light emitted from the illumination light sources 37 enters the image sensor unit 34. More specifically, the image capturing unit 30 has the frame body 32 in the predetermined box shape that is provided, on an opposed face thereof opposed to the image capture object, with the opening 32c to capture the image of the image capture object and with the reference chart KC, the image of which is captured simultaneously with an image of the image capture object through the opening 32c to provide the predetermined color reference; the illumination light sources 37 that illuminate the image capture object and the reference chart KC under substantially the same illumination condition; the image sensor unit (sensor unit) 34 that captures the images of the image capture object and the reference chart KC by receiving reflected light from the image capture object opposed to the opening 32c and reflected light from the reference chart KC; and the diffusion plate (specular reflection preventing member) 40 that is arranged at the specular reflection areas SA on which part of the illumination light from the illumination light sources 37 is reflected as specular reflection light toward the image sensor unit 34, and that prevents that the light is reflected thereon to become specular reflection light toward the image sensor unit 34.

Accordingly, the diffusion plate 40 can prevent any specular reflection light from the illumination light sources 37 mounted in the frame body 32 from entering the image sensor unit 34 in a manner overlapping with the images of the image capture object outside the frame body 32 and of the reference chart KC inside the frame body 32, and the images of the image capture object and the color reference chart KC can always be captured in a stable positional relation.

In the image capturing unit 30 provided in the image forming apparatus 1 of the present embodiment, the bottom face portion 32a of the frame body 32 is provided with the opening 32c and the reference chart KC side by side in the predetermined direction (main-scanning direction), and the illumination light sources 37 are arranged in positions above an intermediate area between the image capturing area of the image capture object through the opening 32c and the image capturing area of the reference chart KC while the diffusion plate 40 is arranged in some position in the intermediate area between the bottom face portion 32a and the illumination light sources 37.

Accordingly, it is possible, with a simple configuration, to surely prevent any specular reflection light from entering the image sensor unit 34, and to always capture the images of the image capture object and the color reference chart KC in a stable positional relation in a low-cost and highly accurate manner.

The diffusion plate 40 of the image capturing unit 30 is surface-treated so as to reflect the incident light from the illumination light sources 37 toward directions other than toward the image sensor unit 34, and/or so as to absorb the incident light from the illumination light sources 37.

Accordingly, it is possible, with a simple and low-cost configuration, to prevent any specular reflection light from the illumination light sources 37 from entering the image sensor unit 34 in a manner overlapping with the images of the image capture object outside the frame body 32 and of the reference chart KC inside the frame body 32, and to capture the images of the image capture object and the color reference chart KC at low cost and always in a stable positional relation.

Note that, although, in the description given above, the diffusion plate 40 of the image capturing unit 30 is mounted on the side faces of the frame body 32 so as to be arranged in the frame body 32, the mounting structure of the diffusion plate 40 is not limited to the above-described structure. For example, if the frame body 32 is provided therein with an optical path length changing member that changes the optical path length of an optical path from the image capture object or the reference chart KC, the diffusion plate 40 may be mounted on the optical path length changing member.

Figure 20:
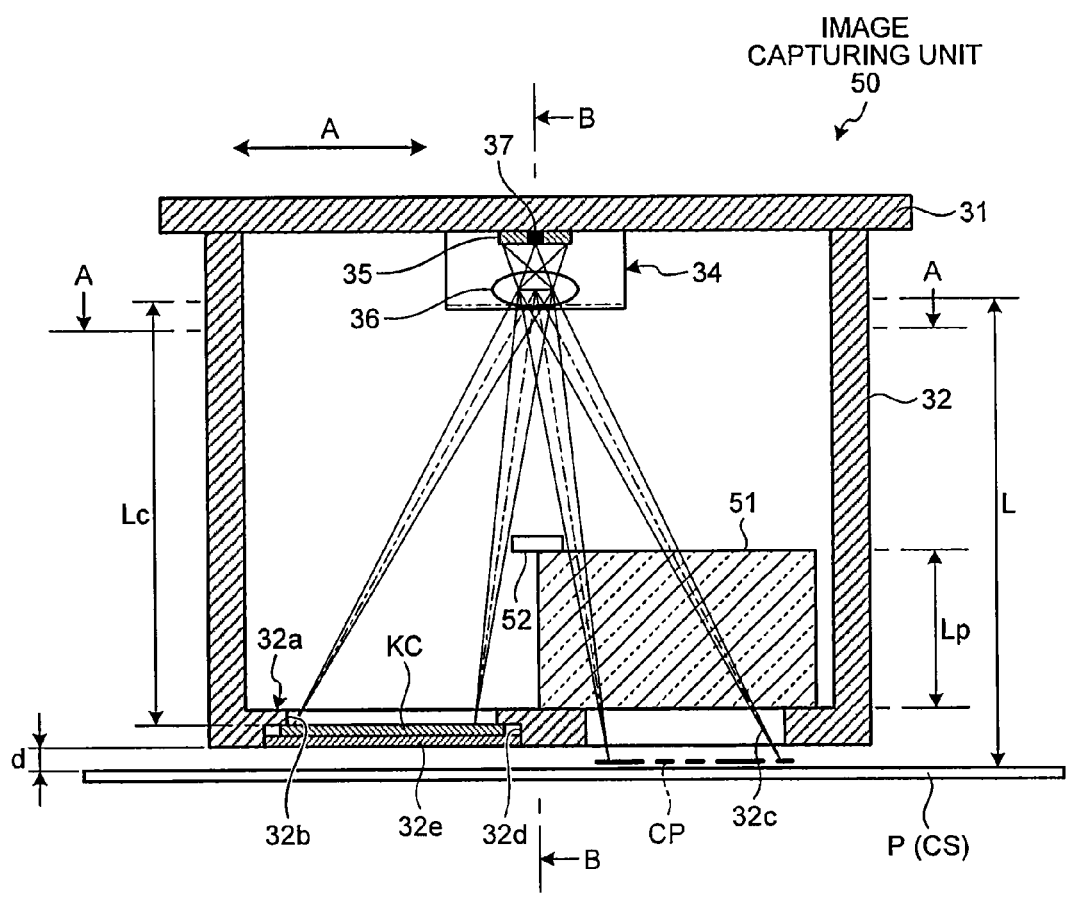
FIG. 20 is a front sectional view of an image capturing unit provided with an optical path length changing member and a diffusion plate.
Figure 21:
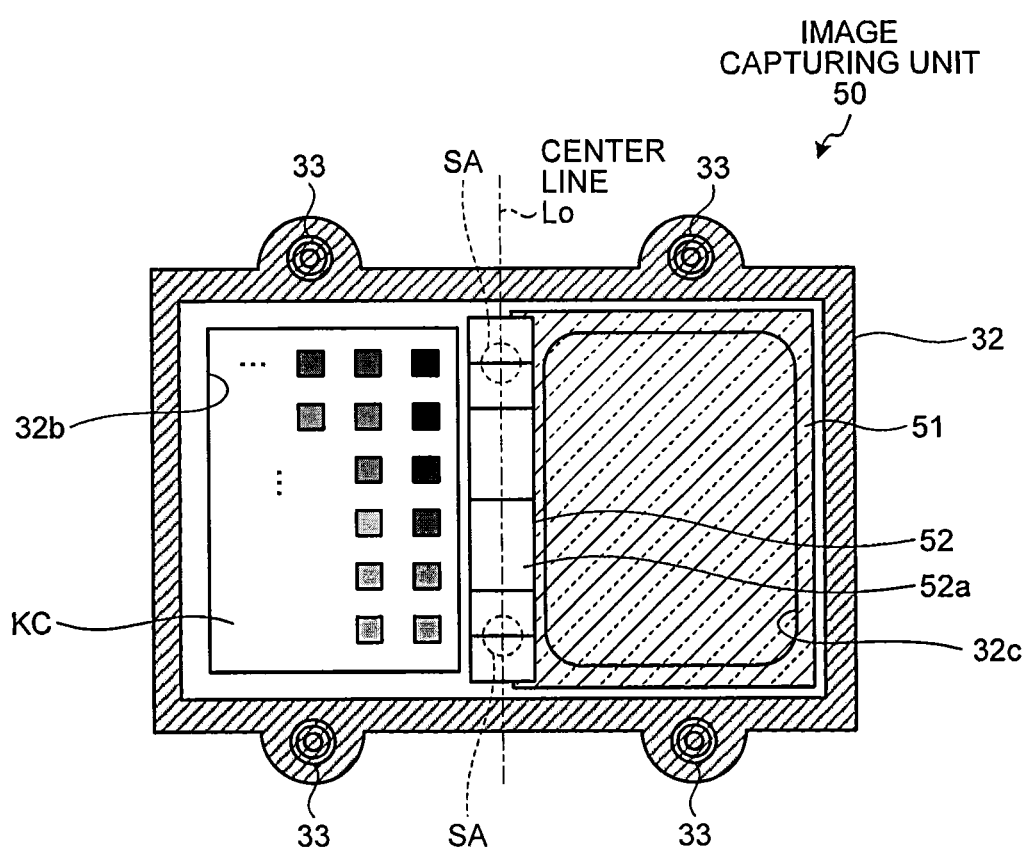
FIG. 21 is a sectional view of the image capturing unit as viewed along arrows A-A in FIG. 20.
Figure 22:
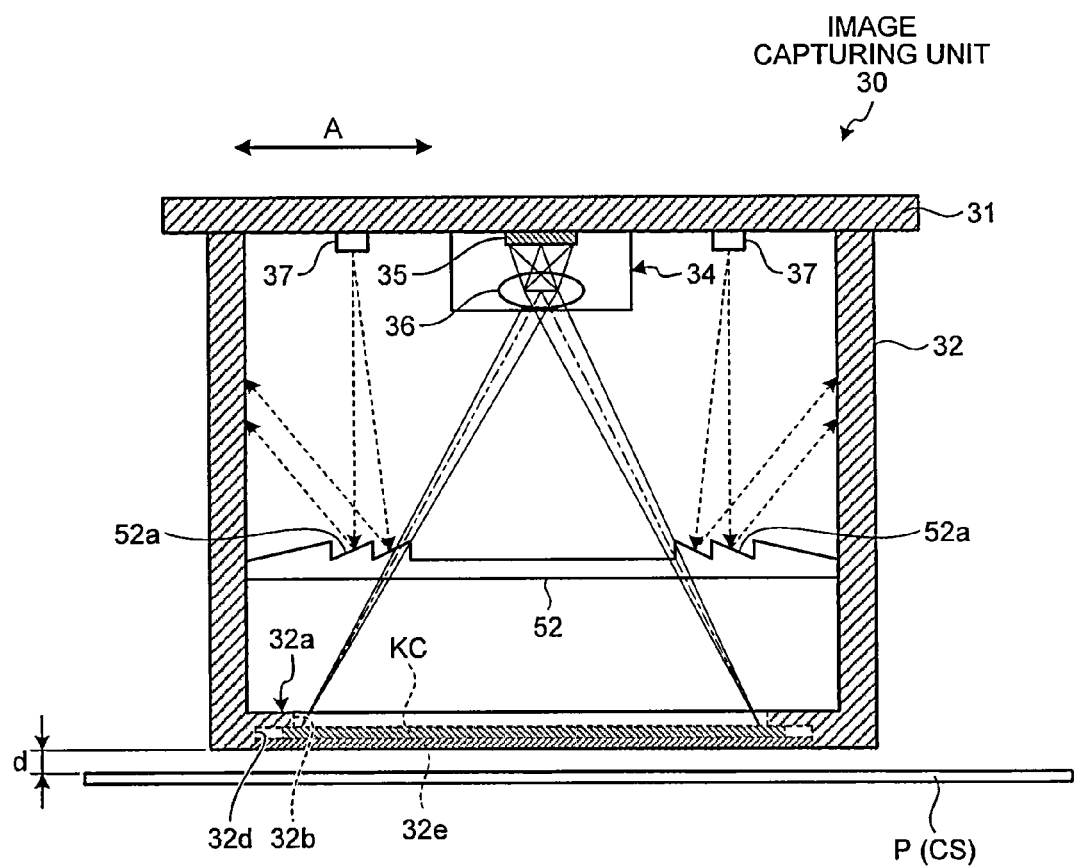
FIG. 22 is a sectional view of the image capturing unit as viewed along arrows B-B in FIG. 20.

For example, in the case of an image capturing unit 50 illustrated in FIGS. 20 to 23 where an optical path length changing member 51 is provided at the opening 32c to capture the image of the image capture object outside the frame body 32, a diffusion plate 52 may be provided at the upper end of the optical path length changing member 51. FIG. 20 is a front sectional view of the image capturing unit 50; FIG. 21 is a sectional view of the image capturing unit 50 as viewed along arrows A-A in FIG. 20; and FIG. 22 is a sectional view of the image capturing unit 50 as viewed along arrows B-B in FIG. 20. Note that, in FIGS. 20 to 23, the same numerals are given to the same component parts as those of the image capturing unit 30 of FIGS. 4 to 7, and detailed description thereof will be omitted.

Specifically, in the image capturing unit 50, the optical path length changing member 51 is arranged on the bottom face portion 32a around the opening 32c to capture the image of the image capture object outside the frame body 32 so as to cover the opening 32c. A transmissive member having a refractive index n (where n is an arbitrary number) is used as the optical path length changing member 51. As illustrated in FIG. 20, the optical path length changing member 51 has an external shape larger than the opening 32c and is disposed in the frame body 32. When light passes through the optical path length changing member 51 having the refractive index n, the optical path length of the light increases with the refractive index n, so that the light enters the two-dimensional image sensor 35 while an image looks lifted up. With the length of the optical path length changing member 51 denoted by Lp, a lift-up amount C of the image can be obtained by equation (1) below.

$$C = Lp(1-1/n) \quad (1)$$

A focal length L to a focal plane of the image capturing unit 50 except the reference chart KC, that is, a focal length to the surface of the recording medium P, the image of which is captured through the optical path length changing member 51 and the opening 32c, can be obtained by equation (2) given below.

$$L = Lc + Lp(1-1/n) \quad (2)$$

Lc represents the distance between the apex of the lens 36 on the side of the target for image capture and the reference chart KC, and n is the refractive index of the optical path length changing member 51.

For example, when the refractive index n of the optical path length changing member 51 is 1.5, equation (2) is expressed as $L = Lc + Lp(1-1/1.5) = Lc + Lp(1/3)$. Thus, the optical path length can be increased by approximately one third of the length Lp of the optical path length changing member 51. Note that, with LP=9 [mm], L becomes that L=Lc+3 [mm]. Thus, the image location of the reference chart KC can coincide with the focus position of the image capture surface of the recording medium P, and thereby, the reference chart KC and the image capture surface of the recording medium P can be set to have a conjugate relation with each other.

Figure 23:
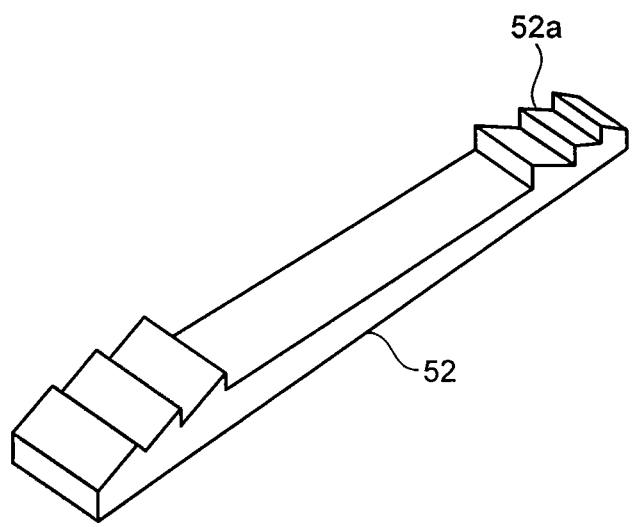
FIG. 23 is an enlarged perspective view of the diffusion plate of FIGS. 20 to 22.
Figure 24:
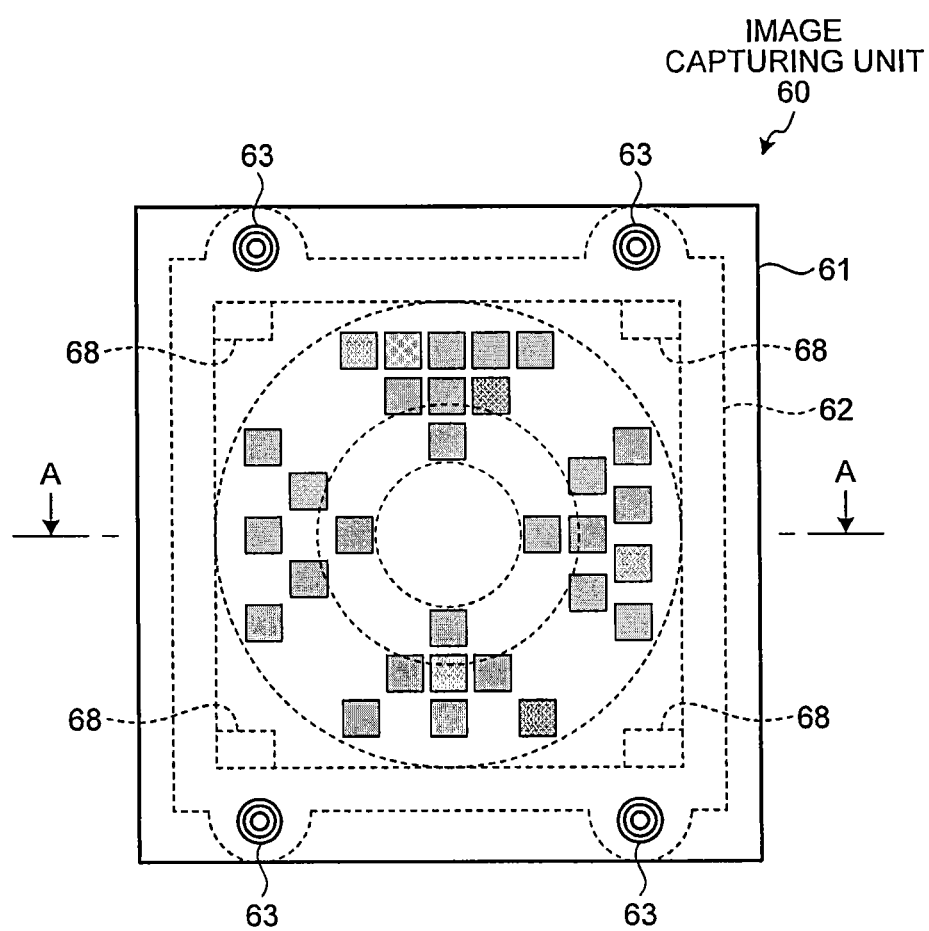
FIG. 24 is a plan view of an image capturing unit formed with an opening at a central part of a bottom face thereof.

In the image capturing unit 50, the diffusion plate 52 is mounted in a position directly below the image sensor unit 34 at the upper end of the optical path length changing member 51. This arrangement simplifies the configuration of the image capturing unit 50 and saves the time and effort to attach the diffusion plate 52 to the frame body 32. As illustrated in FIGS. 21 to 23, the diffusion plate 52 is provided with diffusing surfaces 52a only in the vicinities of the specular reflection areas SA specularly reflecting part of the incident light from the illumination light sources 37 toward the image sensor unit 34. This configuration can appropriately prevent the specular reflection and can make the diffusion plate 52 smaller and lighter in weight.

In the image capturing unit 50, in the same manner as in the case of the above-described image capturing unit 30, the illumination light from the same illumination light sources 37 serves both as the illumination light that irradiates the reference chart KC and as the illumination light that irradiates the image capture surface of the recording medium P through the optical path length changing member 51 and the opening 32c. Thus, the image capturing unit 50 can simultaneously capture the images of the reference chart KC and the image capture surface of the recording medium P under the same illumination condition.

In the image capturing unit 50, the opening 32c for the image capturing area and the reference chart KC are arranged, as a layout condition thereof, substantially symmetrically with each other with respect to the center line Lo connecting the center of the lens 36 and the illumination light sources 37. Accordingly, the image capturing conditions of the two-dimensional image sensor 35 can be line-symmetric, which improves the accuracy of the two-dimensional image sensor 35 in the color adjustment processing and the color measuring processing which use the reference chart KC.

Note that, in each of the descriptions above, each of the image capturing units 30 and 50 has, at the bottom face portion 32a, the reference chart KC and the opening 32c to capture the image of the image capture object arranged in positions substantially symmetrical with each other with respect to the center line Lo serving as the center therebetween. The layout configuration of the reference chart KC and the opening 32c is, however, not limited to the above-described layout configuration. The layout configuration may be such as that illustrated as an image capturing unit 60 in FIGS. 24 to 27. In the image capturing unit 60, a frame body 62 fixed to a base plate 61 is formed, on a central part of a bottom face portion (opposed face) 62a thereof, with a circular opening 62b having a predetermined size and with a torus-shaped depressed portion 62c having a diameter larger than that of the opening 62b around the opening 62b serving as the canter of the depressed portion 62c. The depressed portion 62c is formed over a predetermined width on the outer circumference of the opening 62b on the side of the recording medium P. The frame body 62 is fixed to the base plate 61 with fastening members 63. The image capturing unit 60 is mounted on the carriage 6 in a state in which the lower surface of the bottom face portion 62a of the frame body 62 faces the recording medium P on the platen 14 at the predetermined distance d therefrom.

Figure 25:
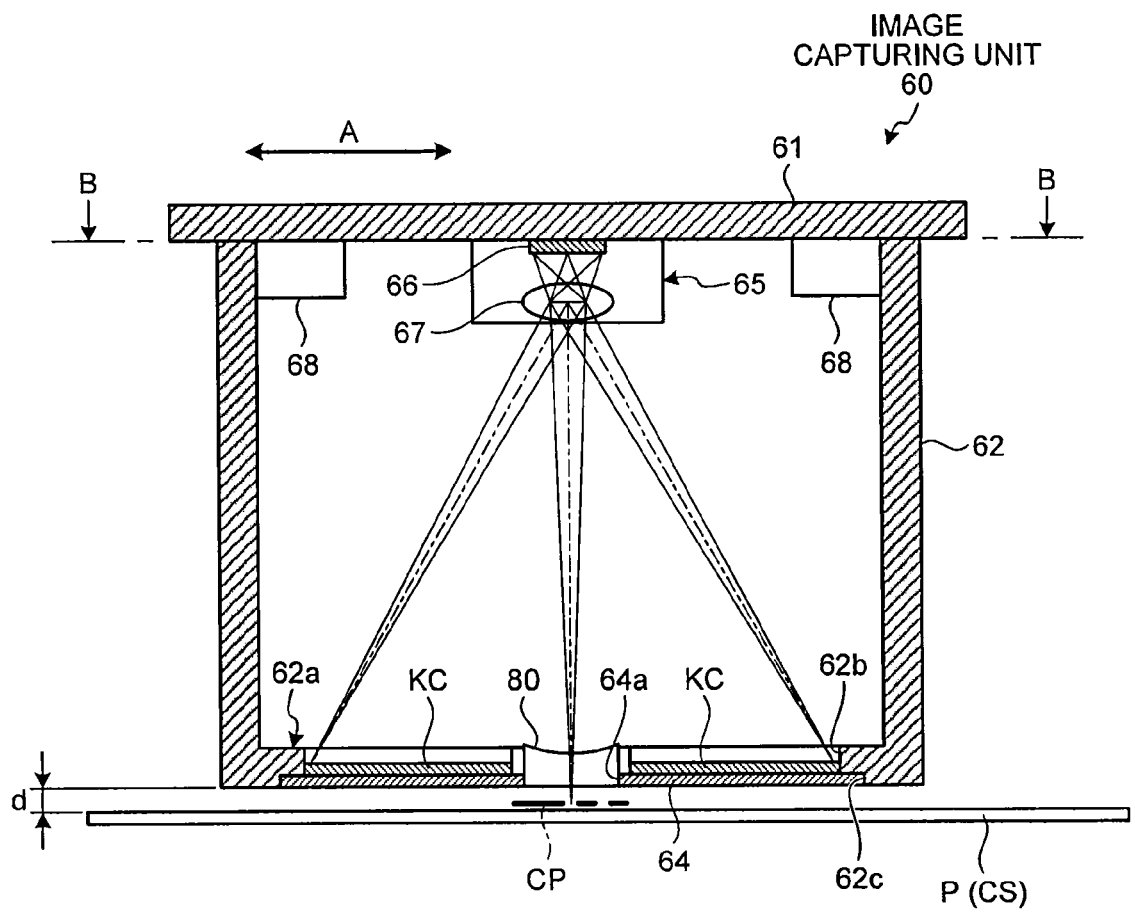
FIG. 25 is a sectional view of the image capturing unit as viewed along arrows A-A in FIG. 24.

As illustrated in FIG. 25, a circular disc-shaped holding member (opposed face) 64 is mounted on the depressed portion 62c of the bottom face portion 62a in a detachable manner by a method of adhesion, screw fixation, fitting, or the like. The holding member 64 is formed, at a central part thereof, with a circular opening 64a having a predetermined size.

Note that the frame body 62 is not limited to a quadrangular box-shaped one, but may be, for example, a circular cylindrical box-shaped one or an elliptic cylindrical box-shaped one that has the bottom face portion 62a formed, at a central part thereof, with the opening 62b.

The base plate 61 of the image capturing unit 60 is arranged with an image sensor unit 65 at a central part of a surface thereof on the side of the frame body 62. The image sensor unit (sensor unit) 65 is provided with a two-dimensional image sensor 66, such as a CCD sensor or a CMOS sensor, and with a lens 67.

The opening 64a is used for capturing images of the reference color patches KP of the reference sheet KS and the color measurement adjusting color patches CP of the color measurement adjusting sheet CS which serve as a target for image capture (image capture object) formed on the recording medium P. Although the opening 64a only needs to have a size at least large enough to be capable of capturing all images (patch images) to be captured, the distance d existing between the frame body 32 and the target for image capture generates shadow on the periphery of the opening 64a. With the shadow taken into consideration, the opening 64a is thus formed in a state of being opened to a size slightly larger than that of the image capturing area of the target for image capture. Accordingly, the center of the opening 64a is located in a position opposed to the image sensor unit 34, that is, on the optical axis of the image sensor unit 34.

Figure 26:
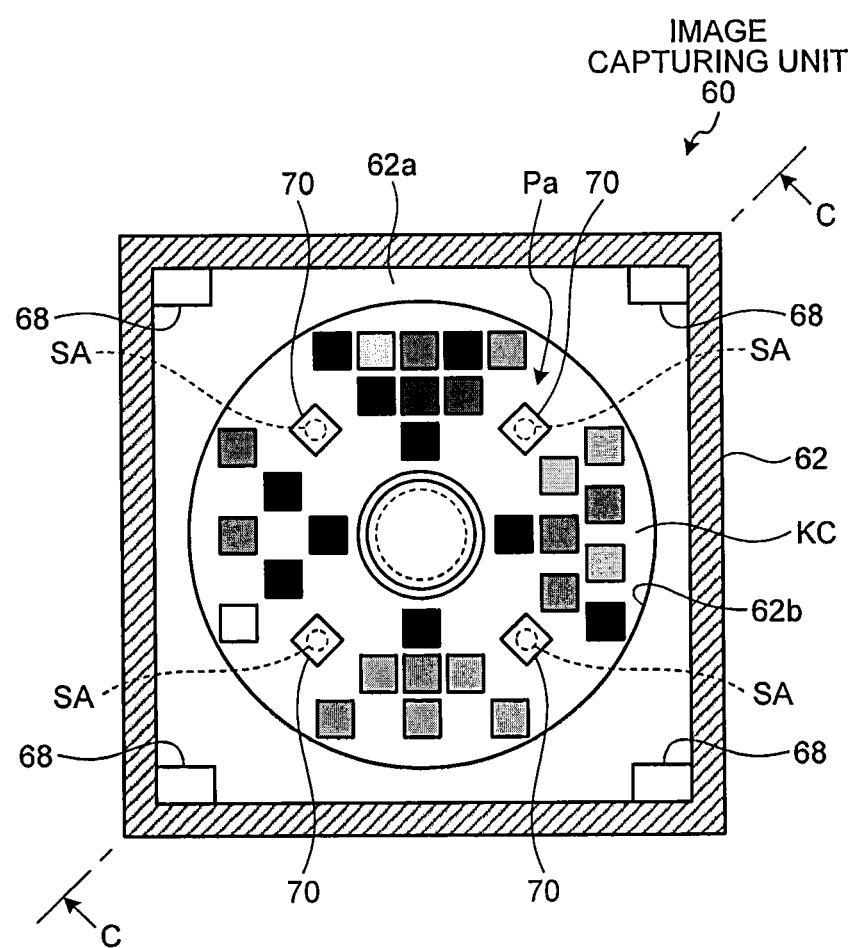
FIG. 26 is a sectional view of the image capturing unit as viewed along arrows B-B in FIG. 25.
Figure 27:
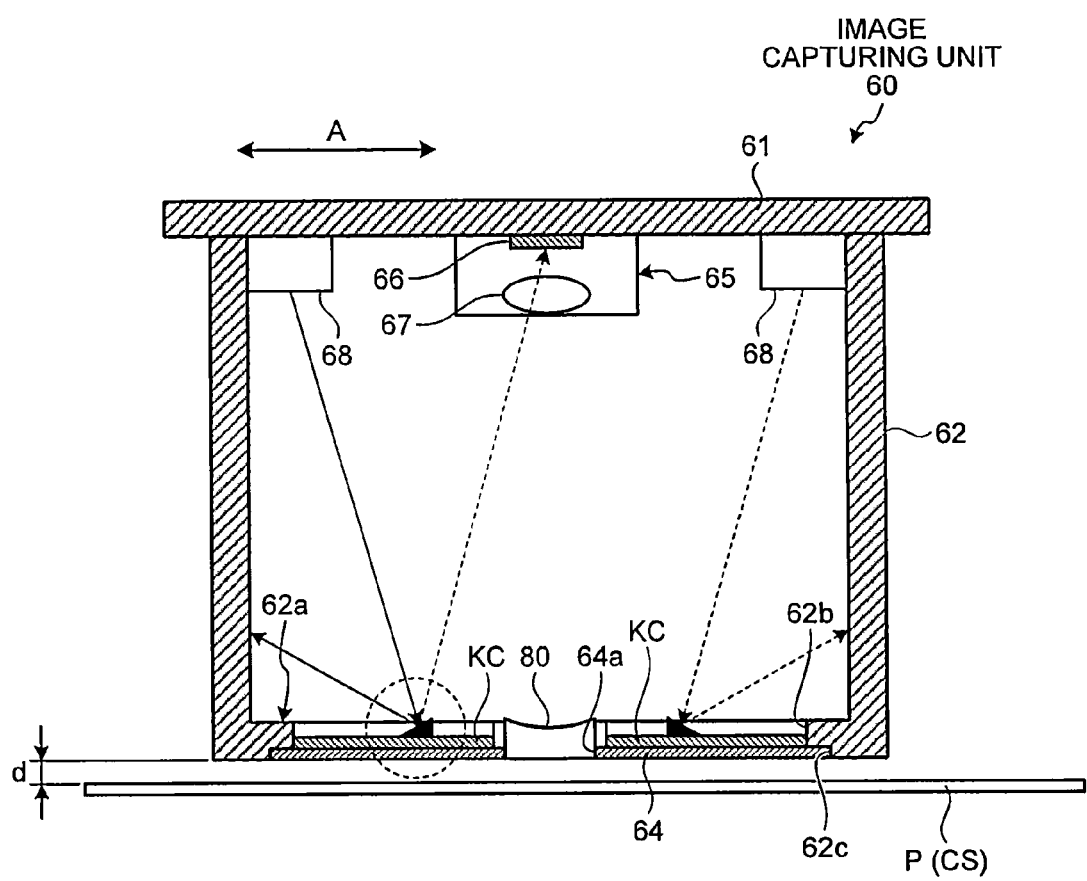
FIG. 27 is a sectional view of the image capturing unit as viewed along arrows C-C in FIG. 26.

As illustrated in FIG. 26, the reference chart (reference chart portion) KC is detachably mounted over a predetermined width in a torus shape (annularly) at a portion on the holding member 64 positioned in the opening 62b.

The reference chart KC is photographed by the image sensor unit 65 simultaneously with the reference color patches KP and the color measurement adjusting color patches CP as an object to be compared with the captured image color measurement values of the reference color patches KP of the reference sheet KS and the color measurement adjusting color patches CP of the color measurement adjusting sheet CS serving as a target for image capture in the color adjustment processing. Specifically, the image sensor unit 65 captures images of the reference color patches KP of the reference sheet KS and the color measurement adjusting color patches CP of the color measurement adjusting sheet CS positioned outside the frame body 62 through the opening 64a formed in the holding member 64 embedded in the depressed portion 62c of the bottom face portion 62a of the frame body 62, and also captures, as the object of comparison, images of the color patches on the reference chart KC mounted on the upper surface of the outer periphery of the opening 64a of the holding member 64 mounted on the bottom face portion 62a of the frame body 62.

As illustrated in FIG. 26, in the same manner as the reference sheet KS, the reference chart KC is provided, on the face thereof inward of the frame body 62 (on the upper face thereof), with a plurality of reference color patches Pa for color measurement that are arranged in a circular manner along the torus-shaped opening 62b.

The reference color patches Pa for color measurement include color patches of the first order colors of Y, M, and C; color patches of the second order colors of R, G, and B; grayscale patches; and patches of the third order colors.

In the same manner as the reference color patches KP of the reference chart KC, the patches constituting the reference color patches Pa for color measurement are measured in advance to obtain the color specification values (Lab values) in the Lab color space serving as the standard color space by using the spectrometer BS, and the color specification values serve as reference values used when the color of the color measurement adjusting color patches CP of the color measurement adjusting sheet CS, to be described later, are measured.

Figure 28:
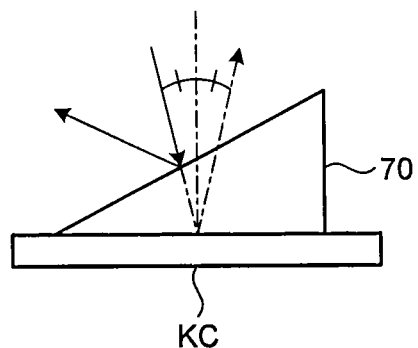
FIG. 28 is an explanatory diagram of diffusion action of specular reflection light by the diffusion plate.

Note that the configuration of the reference color patches Pa for color measurement arranged in the reference chart KC is not limited to the example arrangement illustrated in FIG. 28, but any arrangement of the patches can be used. For example, it is possible to use patches that enable identification of as wide color range as possible, or the patches of the first order colors of Y, M, C, and K and the grayscale patches may be composed of patches having color measurement values of the ink used for the image forming apparatus 1. The patches of the second order colors of R, G, and B on the reference chart KC may be composed of patches having color measurement values achievable by the ink used for the image forming apparatus 1, or it is possible to use reference color patches with specified color measurement values such as Japan Color values. The reference chart KC need not necessarily have the reference color patches Pa having a general shape, but only needs a plurality of colors usable for color measurement to be arranged so that positions of the colors can be identified.

The reference chart KC is detachably mounted on the upper surface of the holding member 64 detachably mounted on the torus-like depressed portion 62c formed on the circumference of the opening 62b formed at the bottom face portion 62a of the frame body 62. Accordingly, the image of the reference chart KC can be captured by the two-dimensional image sensor 66 of the image sensor unit 34 at the same focal length as that for targets for image capture such as the recording medium P.

As described above, the reference chart KC is detachably mounted on the upper surface of the holding member 64 detachably mounted on the torus-like depressed portion 62c formed on the circumference of the opening 62b formed at the bottom face portion 62a of the frame body 62. Accordingly, if dust or the like that has entered the frame body 62 adheres on the surface of the reference chart KC, the holding member 64 and the reference chart KC can be dismounted, and mounted again after the reference chart KC is cleaned up. This improves accuracy of measurement of the reference chart KC.

The image capturing unit 60 is provided with illumination light sources 68 arranged on the base plate 31 in positions at four corners of the quadrangular-shaped frame body 62. As the illumination light source 68, for example, an LED like that of the above-described illumination light source 37 is used. The illumination light sources 68 uniformly irradiate, with illumination light, the reference chart KC and, through the opening 64a, the target for image capture on the recording medium P. The arrangement positions of the illumination light sources 68 are not limited to the four corners of the base plate 61 in the frame body 62, but may be any appropriate positions from which the illumination light sources 68 uniformly irradiate, with illumination light, the reference chart KC and, through the opening 64a, the target for image capture on the recording medium P. Note that the type of the illumination light source 68 is not limited to LEDs. For example, an organic EL device may be used as the illumination light source 68. If the organic EL device is used as the illumination light source 68, illumination light having a spectral distribution close to that of sunlight is obtained, and therefore, an improvement in accuracy of the color measurement can be expected.

As illustrated in FIG. 26, diffusion plates 70 are arranged on the surface of the reference chart KC, each at each of the specular reflection areas SA on which incident light from the illumination light sources 68 is specularly reflected toward the image sensor unit 65. As indicated by solid-line arrows in FIGS. 27 and 28, the diffusion plates (specular reflection preventing members) 70 diffuse the incident light from the illumination light sources 68 toward directions other than toward the image sensor unit 65, thus preventing the incident light from becoming specular reflection light toward the image sensor unit 65 as indicated by dashed-line arrows in FIGS. 27 and 28.

Accordingly, it is possible to prevent any specular reflection light from the illumination light sources 68 from entering the image sensor unit 65 in a manner overlapping with the images of the image capture object outside the frame body 62 and of the reference chart KC inside the frame body 62, and the image capture object and the reference chart KC can be equally irradiated with the illumination light. As a result, the image capturing unit 60 can capture the images of the image capture object and the reference chart KC accurately in a stable positional relation.

In the image capturing unit 60, a concave lens (optical path length changing member for image capture object) 80 is embedded in the opening 64a formed at the central part of the holding member 64 mounted on the bottom face portion 62a of the frame body 62. The concave lens 80 is provided in the state of being arranged in the optical path between the recording medium P and the two-dimensional image sensor 66 through the opening 64a.

The concave lens 80 is embedded in the opening 64a formed on the optical axis of the image sensor unit 65. Accordingly, the center of the concave lens 80 is positioned on the optical axis of the image sensor unit 65. As the concave lens 80, a concave lens is used that has a curvature that allows the optical path length from the image capture surface of the recording medium P to the image sensor unit 65 to coincide with the optical path length from the reference chart KC to the image sensor unit 65.

Specifically, in the image capturing unit 60, when measured from the image sensor unit 65, the distance to the reference chart KC on the holding member 64 differs from that to the target for image capture (such as the color measurement adjusting color patch CP formed on the recording medium P) through the opening 64a. For this reason, when the image of the target for image capture is captured with the focal length set to that to the reference chart KC, the focus is placed out of position of the target for image capture, and thus, the lens is unfocused because the focal length is that to the reference chart KC.

In the image capturing unit 60 of the present embodiment, however, the concave lens 80 is embedded in the opening 64a through which the image of the target for image capture is captured, and thus, the image of the target for image capture is captured in the state in which the focal length to the target for image capture is extended to that to the position of the target for image capture due to the curvature of the concave lens 80 (in the state with the optical path length changed).

As described above, in the image capturing unit 60, the opening 64a is formed in the center of the holding member 64 embedded in the bottom face portion 62a in the position opposed to the image sensor unit (sensor unit) 65. The reference chart KC is provided in the annular (torus-like) area having the predetermined width around the opening 64a. The illumination light sources 68 are arranged at the four corners in the upper part of the frame body 62 serving as positions from which the illumination light sources 68 illuminate the reference chart KC and the image capture object, the image of which is captured through the opening 64a, under substantially the same illumination condition. The diffusion plates (specular reflection preventing members) 70 are arranged at all of the specular reflection areas SA for the light emitted by the illumination light sources 68.

Accordingly, the diffusion plates 70 can prevent any specular reflection light from the illumination light sources 68 mounted in the frame body 62 from entering the image sensor unit 65 in a manner overlapping with the images of the image capture object outside the frame body 62 and of the reference chart KC inside the frame body 62, and the imaged of the image capture object and the color reference chart KC can always be captured in a stable positional relation.

Figure 29:
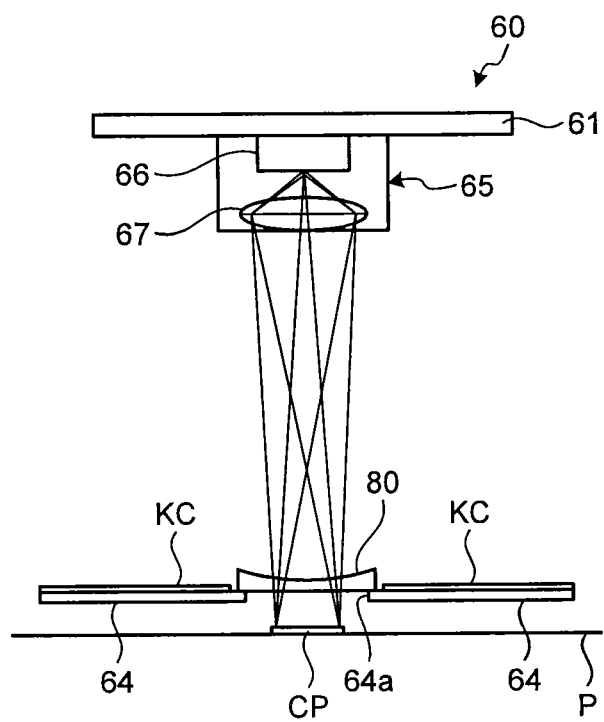
FIG. 29 is an essential part front view of the image capturing unit in which a convex lens is disposed on a holding member formed with an opening.

Note that, although the description given above has explained the case with the concave lens 80 embedded in the opening 64*a*, the concave lens 80 is not limited to being embedded in the opening 64*a*, but may be disposed in any appropriate position on the optical path between the target for image capture and the image sensor unit 65 through the opening 64*a*, such as in a position on the holding member 64 around the opening 64*a*, as illustrated in FIG. 29. In the case of arranging the concave lens 80 in an appropriate position between the opening 64*a* and the image sensor unit 65, however, the position needs to be out of the optical path to capture the image of the reference chart KC, and the curvature of the concave lens 80 needs to meet the arrangement position thereof.

In the image capturing unit 60, the illumination light from the same illumination light sources 37 serves both as the illumination light that irradiates the image capture surface of the recording medium P through the concave lens 80 and the opening 64*a* and as the illumination light that irradiates the reference chart KC. Thus, the image capturing unit 60 can simultaneously capture the images of the reference chart KC and the image capture surface of the recording medium P under the same illumination condition.

Note that, although the description given above has explained the case in which the diffusion plates 70 are arranged on the reference chart KC, the diffusion plates are not limited to being arranged on the reference chart KC.

Figure 30:
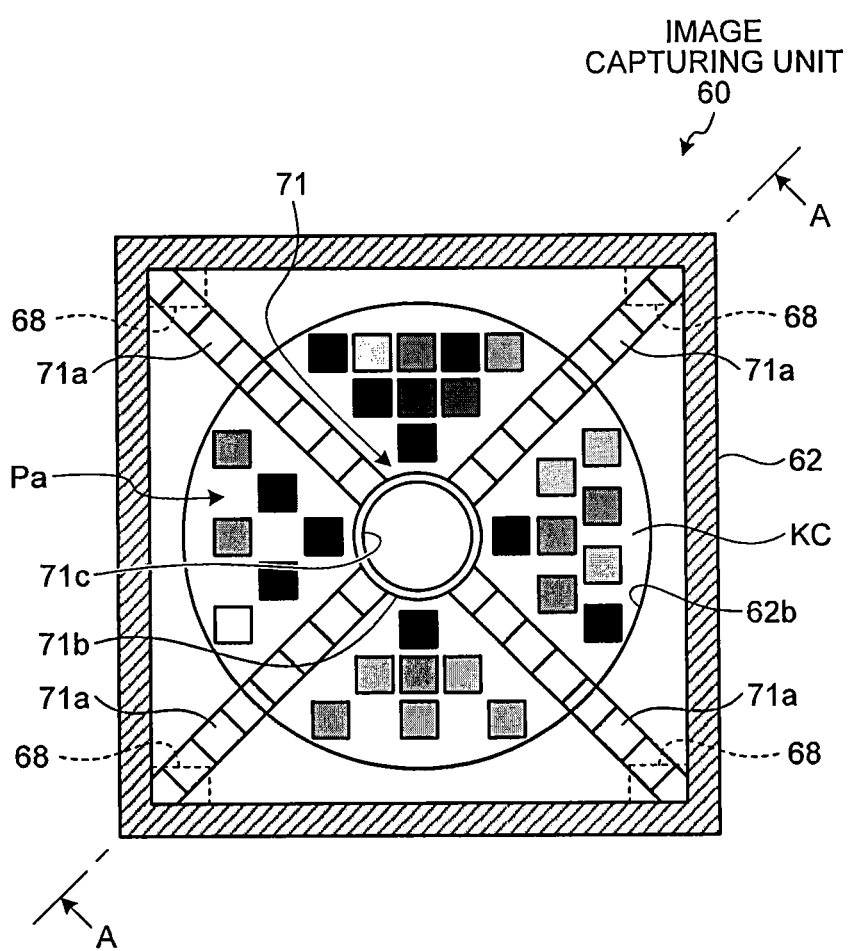
FIG. 30 is a plan sectional view of the image capturing unit in which a diffusion plate is provided above a bottom face of a frame body.
Figure 31:
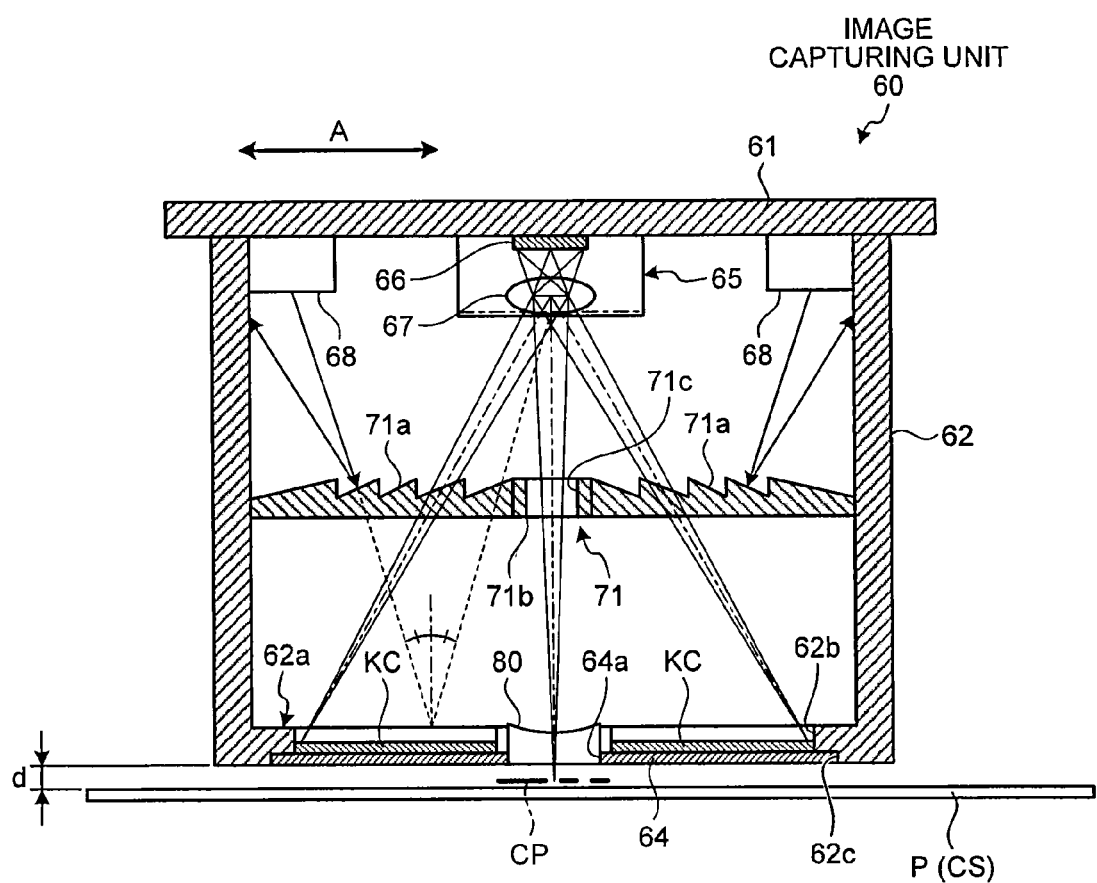
FIG. 31 is a sectional view of the image capturing unit as viewed along arrows A-A in FIG. 30.
Figure 32:
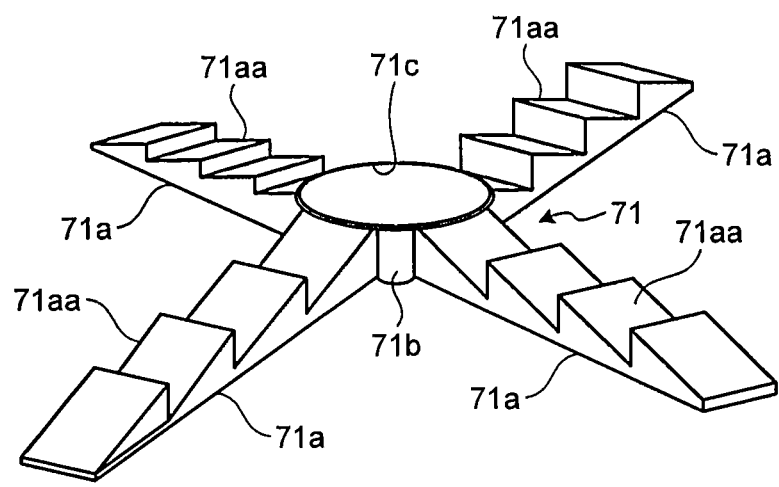
FIG. 32 is an enlarged perspective view of the diffusion plate of FIGS. 30 and 31.

For example, as illustrated in FIGS. 30 to 32, a diffusion plate (specular reflection preventing member) 71 may be arranged in a midway position between the base plate 61 and the bottom face portion 62*a*. In this case, the diffusion plate 71 has diffusion plate portions 71*a* that extend from wall surfaces of the frame body 62 at the four corners of the frame body 62 where the illumination light sources 68 are arranged, to near the center of the frame body 62 located directly below the image sensor unit 65; a circular portion 71*b* that is provided in the central part and is connected to the diffusion plate portions 71*a*; and an opening 71*c* that is formed in the center of the circular portion 71*b*.

As illustrated in FIGS. 31 and 32, the diffusion plate portions 71*a* are formed so that the entire upper surfaces (surfaces on the side of the illumination light sources 68) thereof are formed into step-like diffusing surfaces 71*aa* all the way from mounting portions onto the frame body 62 to the circular portion 71*b* at the center. In order to prevent specular reflection light reflected on the bottom face portion 62*a* of the frame body 62 from entering the image sensor unit 65 as indicated by a dashed-line arrow in FIG. 31, the diffusion plate 71 uses the diffusing surfaces 71*aa* to diffuse the incident light from the illumination light sources 68 toward directions other than toward the image sensor unit 65 as indicated by solid-line arrows in FIG. 31.

The diffusion plate 71 allows reflected light from the image capture object outside the image capturing unit 60 that enters through the opening 64*a* and the concave lens 80 at the center of the holding member 64*a* to enter the image sensor unit 65 through the opening 71*c*.

Figure 33:
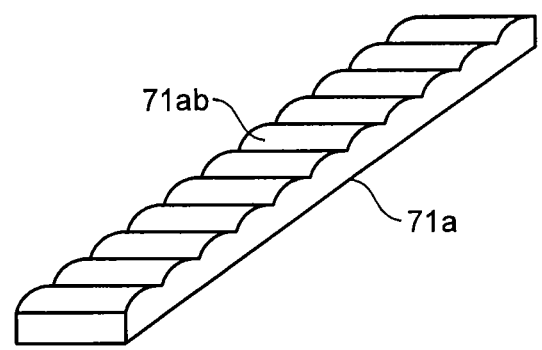
FIG. 33 is an enlarged perspective view illustrating an example of a diffusion plate portion having a circular arc-like diffusion surface.
Figure 34:
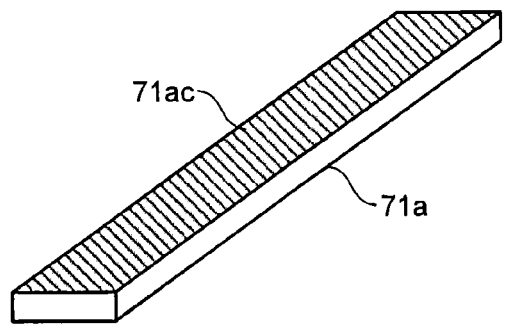
FIG. 34 is an enlarged perspective view illustrating an example of the diffusion plate portion having a finely uneven diffusion surface.

Note that, in FIGS. 30 to 32, the diffusion plate portions 71*a* of the diffusion plate 71 have the surfaces on the side of the illumination light sources 68 which are formed into the step-like diffusing surfaces 71*aa*. The diffusion plate portions 71*a* are, however, not limited to having the step-like diffusing surfaces, but may have, for example, circular arc-like diffusing surfaces 71*ab* as illustrated in FIG. 33, or diffusing surfaces 71*ac* processed to have fine irregularities as illustrated in FIG. 34.

The description given above has explained the case in which the concave lens 80 is disposed, as an optical path length changing member that changes the optical path length, on the optical path between the target for image capture and the image sensor unit 65 which passes through the opening 64*a* of the holding member 64. The optical path length changing member that changes the optical path length is, however, not limited to the concave lens 80, but may be, for example, a transmissive member 81 having a predetermined refractive index, as illustrated in FIG. 35.

Figure 35:
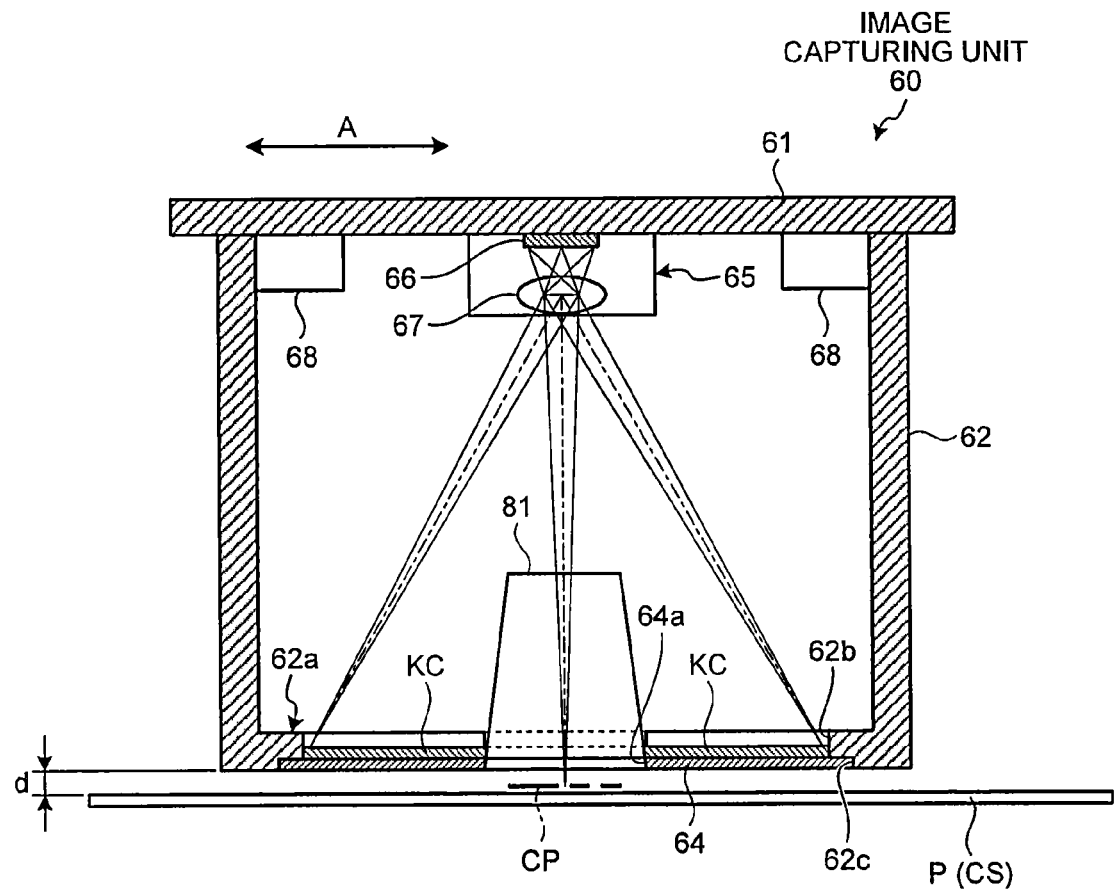
FIG. 35 is a front sectional view of the image capturing unit that uses a transmissive member as the optical path length changing member.

In this case, the transmissive member 81 is, for example, embedded in the opening 64*a* of the holding member 64, as illustrated in FIG. 35. The transmissive member 81 allows the image capturing to be performed in the state in which the focal length to the target for image capture is increased from the focal length at the time when the transmissive member 81 was not present (in the state in which the optical path length is changed).

Specifically, the refractive index of the transmissive member 81 is set so that the optical path length (focal length) from the image capture surface (which is the reference color patches KP of the reference sheet KS) and the image capture object (which is the color measurement adjusting color patches CP of the color measurement adjusting sheet CS) to the image sensor unit 65 coincides with the optical path length (focal length) from the reference chart KC to the image sensor unit 65.

This allows the focus position of the reference chart KC to coincide with the focus position of the image capture object (the reference color patches KP of the reference sheet KS and the color measurement adjusting color patches CP of the color measurement adjusting sheet CS) relative to the image sensor unit 65.

Figure 36:
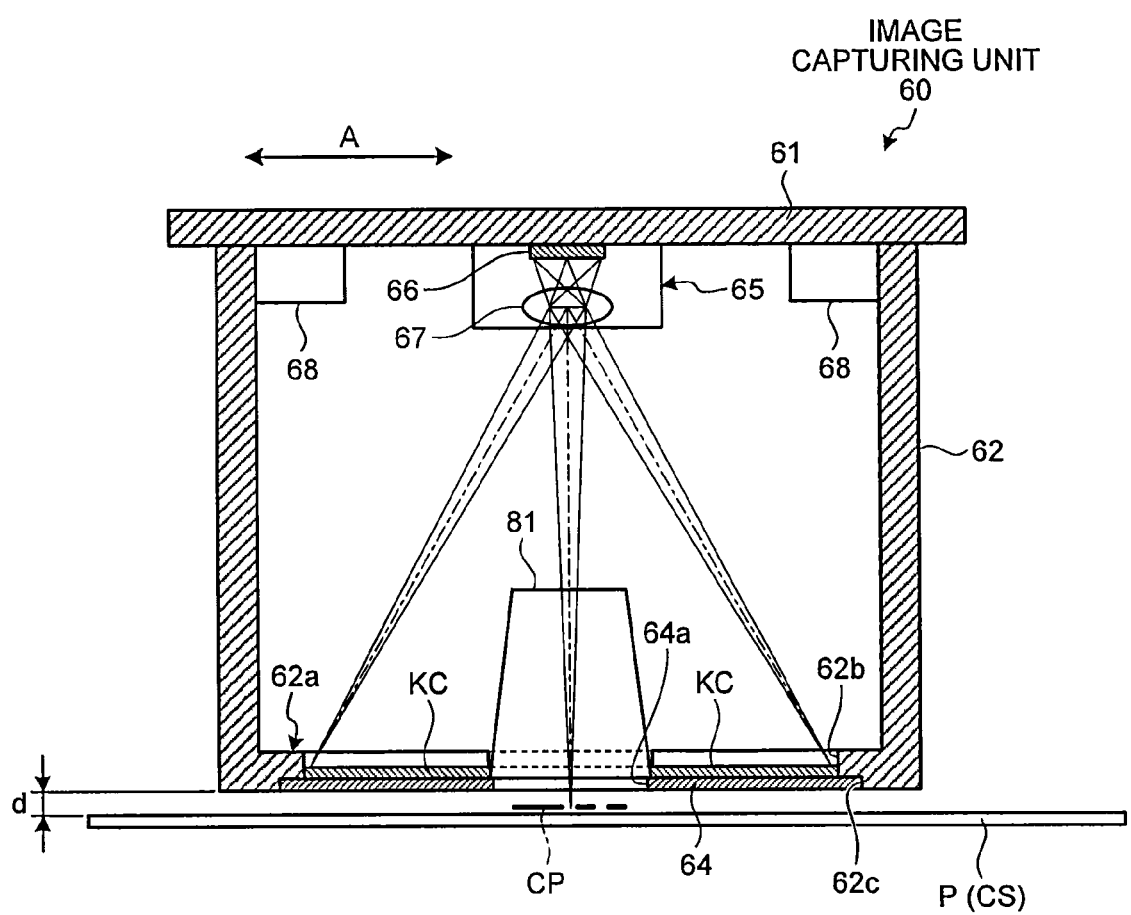
FIG. 36 is a front sectional view of the image capturing unit in which the transmissive member is disposed on the holding member formed with the opening.

Although, as illustrated in FIG. 35, the transmissive member 81 is mounted by being embedded in the opening 64*a* of the holding member 64, the mounting structure of the transmissive member 81 is not limited to the fit-in structure. For example, as illustrated in FIG. 36, the transmissive member 81 may be disposed on the holding member 64 around the opening 64*a*. In the case of disposing the transmissive member 81 in an appropriate position between the opening 64*a* and the image sensor unit 65, however, the transmissive member 81 needs to be positioned or needs to have a shape (such as a cone shape) so as to be out of the optical path to capture the image of the reference chart KC, and needs to have a refractive index suited to the arrangement position.

Figure 37:
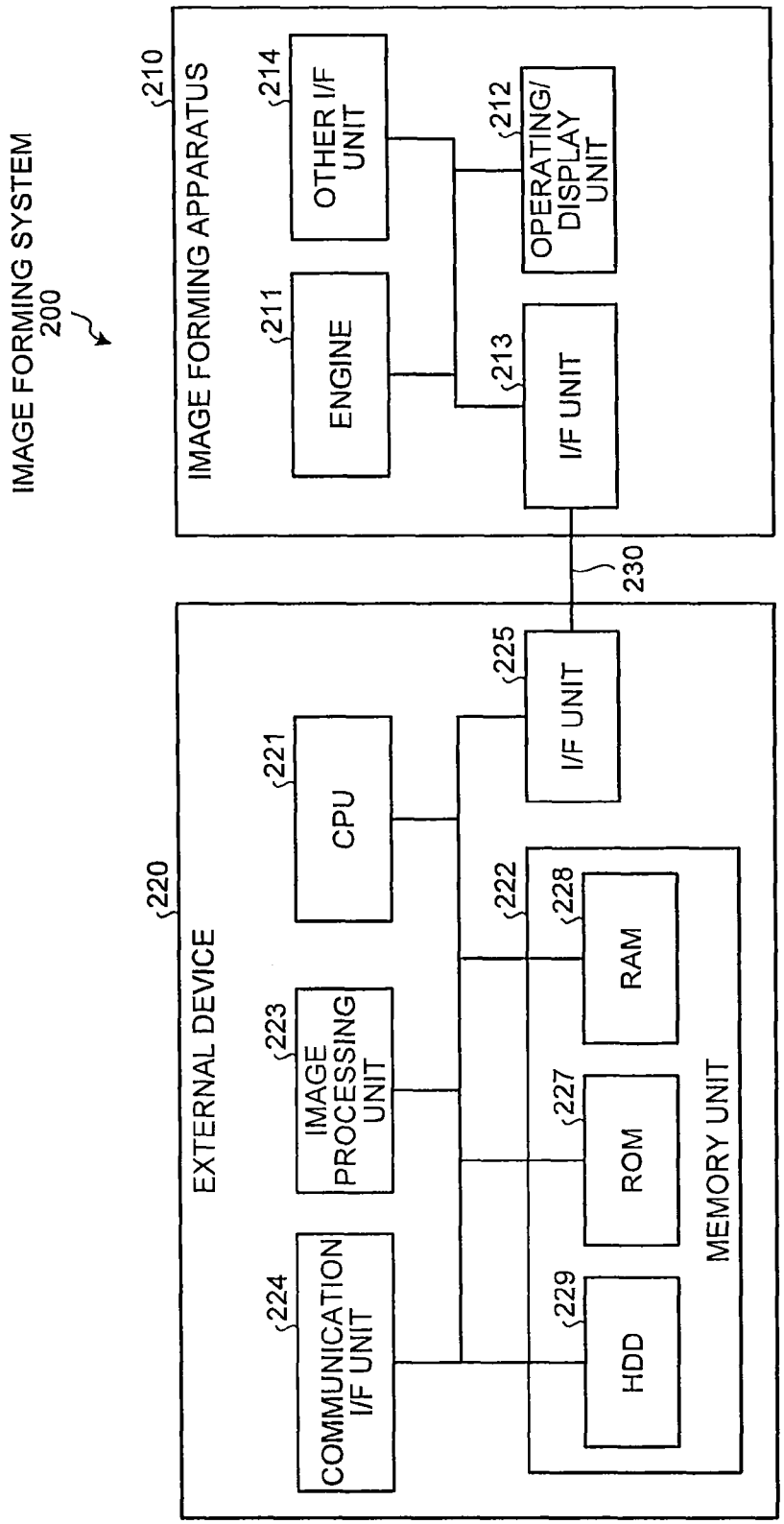
FIG. 37 is a system configuration diagram of an image forming system.

Note that, although the color measurement control unit 106 of the image forming apparatus 1 performs the color measuring process in the above-described present embodiment, the color measuring process need not be performed in the image forming apparatus 1. For example, if an image forming apparatus 210 is connected to an external device 220 to form an image forming system (color measuring system) 200 as illustrated in FIG. 37, image data captured by the image forming apparatus 210 may be output to the external device 220, which in turn may perform the color adjustment processing which involves the color measuring process. In this case, the external device 220 outputs image data adjusted in color to the image forming apparatus 210. The image forming apparatus 210 then performs the image formation based on the image data from the external device 220.

Specifically, the image forming apparatus 210 is provided with an engine 211, an operating/display unit 212, an I/F unit 213, another I/F unit 214, and the like, these units being connected by a bus 215.

The external device 220 can use, for example, a computer having normal hardware and software configurations, and performs the color adjustment processing which involves the color measuring process by introducing, as the software, the color adjustment program including the color measurement program executing the color adjustment processing which involves the color measuring process of the present embodiment. The external device 220 is provided with a CPU 221, a memory unit 222, an image processing unit 223, a communication I/F unit 224, an I/F unit 225, and the like, these units being connected by a bus 226. The memory unit 222 is provided with a ROM 227, a RAM 228, a hard disk (HD) 229, and the like.

The image forming apparatus 210 is connected to the external device 220 by the I/F unit 213 through a line 230. The line 230 is a network, such as an exclusive line or a local area network (LAN), or the Internet, or the like, and can be wired or wireless.

Under control of the external device 220, the image forming apparatus 210 forms an image and outputs it to a recording medium by using the engine 211 based on the image data sent from the external device 220. The engine 211 forms the image on the recording medium by using an inkjet system or the like. The operating/display unit 212 is provided with various operation keys, a display such as a liquid crystal display (LCD), and the like, thus allowing various operations necessary for operating the image forming apparatus 210 to be performed using the operation keys, and also performing display output of various types of information given from the image forming apparatus 210 to the user, onto the display. The other I/F unit 214 is used for connection of an expansion unit or the like.

The engine 211 is provided with a carriage that moves in the main-scanning direction and is similar to that described in the above-described embodiment. The image capturing unit 30 illustrated in the above-described embodiment is mounted on the carriage. Based on color patch data of color measurement adjusting color patches CP sent from the external device 220, the image forming apparatus 210 forms, under control of the CPU 221 of the external device 220, the color measurement adjusting color patches CP to generate a color measurement adjusting sheet CS on the recording medium. The image forming apparatus 210 reads the generated color measurement adjusting color patches CP of the color measurement adjusting sheet CS by using the image capturing unit 30, and sends the read data to the external device 220 via the I/F unit 213.

The external device 220 stores, in the hard disk 229 or the ROM 227, an image forming control program that performs operation control of the image forming apparatus 210, the color adjustment program that performs the color adjustment processing which involves the color measuring process of the present embodiment, and necessary data. Based on the program in the ROM 227 or the hard disk 229, the CPU 221 controls the image forming apparatus 210 so as to make the image forming apparatus 210 perform a basic process as the image forming apparatus 210, and performs the color adjustment processing which involves the color measuring process of the present embodiment.

The hard disk 229 stores the above-mentioned programs, and also stores the various data necessary to execute the color adjustment processing. The hard disk 229 stores, among others, data which has been described in the embodiment above, such as follows: at least either of the Lab values and the XYZ values of the color measurement results of the reference color patches KP formed in an arranged manner on the reference sheet KS; the image capturing reference RGB values obtained when the reference color patches KP of the reference sheet KS have been read by the image capturing unit 30 of the image forming apparatus 210; the reference value linear transformation matrix; the table of neighborhood points and the elected RGB value linear transformation matrix; the initial reference RGB values RdGdBd of the color patches of the color reference chart KC which has been read simultaneously with the reference sheet KS; and the color-measurement-time reference RGB values RdsGdsBds of the reference color patches of the reference chart KC which have been read simultaneously when the color measurement adjusting color patches CP of the color measurement adjusting sheet CS have been read, and the inter-reference-RGB linear transformation matrix which transforms the color-measurement-time reference RGB values RdsGdsBds into the initial reference RGB values RdGdBd.

The communication I/F unit 224 is connected to image processing apparatuses such as a scanner device, a multifunction device, and other external devices via lines such as a network, and receives image data used for making the image forming apparatus 210 output an image.

The image processing unit 223 applies to the image data various types of image processing necessary for the engine 211 of the image forming apparatus 210 to form and output the image.

The CPU 221 controls the operation of the image forming apparatus 210 as described above. The CPU 221 also obtains the color measurement values by performing the color measuring process which is executed by the calculating unit 124, particularly the color measurement value calculating unit 126, of the color measurement control unit 106, and after applying the color adjustment to the image data based on the color measurement values, outputs the color-adjusted image data to the image forming apparatus 210.

Note that, although, in the image forming system 200 of FIG. 37, the external device 220 controls the operation of the image forming apparatus 210, it is also possible that the image forming apparatus 210 itself includes a controller such as a CPU, and the controller controls the image forming operation while the external device 220 performs only the color measuring process to obtain the color measurement values, or only the color adjustment processing including the color measuring process.

In this manner, at least if a device external the image forming apparatus 210 performs the color measuring process, or the color adjustment processing including the color measuring process, the color reproducibility can be improved at low cost and appropriately even in a low-cost type of the image forming apparatus 210.

According to the embodiment, an effect is brought about that the images of an image capture object and a reference chart portion can be captured in a stable manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image capturing unit comprising:
    a frame body that has, on an opposed face thereof opposed to an image capture object, an opening to capture an image of the image capture object;

a sensor unit that captures an image of a predetermined area including the image capture object, the sensor unit being on a sensor unit side of the frame body;

a reference chart portion that is disposed in the predetermined area and an image of which is captured together with an image of the image capture object by the sensor unit;

an illumination light source that illuminates the image capture object and the reference chart portion, the illumination light source being arranged in a position above an intermediate area between an image capturing area of the image capture object through the opening and an image capturing area of the reference chart portion and being arranged on the sensor unit side; and a specular reflection preventing member that is arranged in the intermediate area between the opposed face and the illumination light source, the specular reflection preventing member being configured to prevent specular reflection light of light emitted from the illumination light source from entering the sensor unit.

2. The image capturing unit according to claim 1, wherein the reference chart portion is provided on the opposed face side by side with the opening in a predetermined direction.

3. The image capturing unit according to claim 1, wherein the reference chart portion is provided in an annular area having a predetermined width around the opening;

a plurality of illumination light sources are arranged in positions from which the illumination light sources illuminate the reference chart portion and the image capture object, an image of which is captured through the opening, under substantially the same illumination condition; and the specular reflection preventing member is arranged so as to prevent that specular reflection light of any light emitted from the illumination light sources enters the sensor unit.

4. The image capturing unit according to claim 1, wherein the specular reflection preventing member is surface-treated so as to reflect light emitted from the illumination light source toward directions other than toward the sensor unit, or so as to absorb light emitted from the illumination light source.

5. A color measuring device comprising:

a sensor unit that captures an image of a predetermined area including an image capture object;

a reference chart portion that is disposed in the predetermined area and an image of which is captured together with an image of the image capture object by the sensor unit;

an illumination light source that illuminates the image capture object and the reference chart portion;

a specular reflection preventing member that prevents that specular reflection light of light emitted from the illumination light source enters the sensor unit; and a calculating unit that calculates color measurement values of the image capture object based on image capture data obtained by capturing images of the image capture object and the reference chart portion by the sensor unit.

6. An image forming apparatus comprising:

an image output unit that outputs an image on a recording medium; and the color measuring device according to claim 5, wherein the color measuring device treats an image output by the image output unit as the image capture object and calculates the color measurement values of the image; and after the color measuring device calculates the color measurement values, the image output unit outputs an image based on image data adjusted in color by using the color measurement values.

7. A color measuring system comprising:

an image capturing unit that captures an image of an image capture object that is a target for color measurement; and a calculating unit that calculates color measurement values of the image capture object, wherein the image capturing unit comprises:

a frame body that has, on an opposed face thereof opposed to the image capture object, an opening to capture an image of the image capture object;

a sensor unit that captures an image of a predetermined area including the image capture object, the sensor unit being on a sensor unit side of the frame body;

a reference chart portion that is disposed in the predetermined area and an image of which is captured together with an image of the image capture object by the sensor unit;

an illumination light source that illuminates the image capture object and the reference chart portion, the illumination light source being arranged in a position above an intermediate area between an image capturing area of the image capture object through the opening and an image capturing area of the reference chart portion and being arranged on the sensor unit side; and a specular reflection preventing member that is arranged in the intermediate area between the opposed face and the illumination light source, the specular reflection preventing member being configured to prevent specular reflection light of light emitted from the illumination light source from entering the sensor unit; and the calculating unit calculates the color measurement values of the image capture object based on image capture data obtained by capturing images of the image capture object and the reference chart portion by the sensor unit of the image capturing unit.

8. A color measuring method executed in a color measuring device comprising a sensor unit, a reference chart portion, an illumination light source, a specular reflection preventing member, and a calculating unit, the color measuring method comprising:

an illuminating step at which the illumination light source illuminates an image capture object that is a target for color measurement and the reference chart portion, the illumination light source being arranged above an intermediate area between an image capturing area of the image capture object through an opening of the color measuring device and an image capturing area of a reference chart portion;

an image capturing step at which the sensor unit captures an image of the image capture object and the reference chart portion which are illuminated by the illumination light source; and a calculating step at which the calculating unit calculates color measurement values of the image capture object based on image capture data obtained by capturing images of the image capture object and the reference chart portion by the sensor unit, wherein at the illuminating step, the specular reflection preventing member prevents specular reflection light of light emitted from the illumination light source to enter the sensor unit and the specular reflection preventing member is arranged in the intermediate area between the face and the illumination light source.

* * * * *